United States Patent

Miyachi et al.

[11] Patent Number: 5,920,414
[45] Date of Patent: Jul. 6, 1999

[54] WAVELENGTH DIVISION MULTIPLEXING OPTICAL TRANSMISSION APPARATUS AND OPTICAL REPEATER

[75] Inventors: Masahide Miyachi, Kawasaki; Shigeru Ohshima, Yokohama, both of Japan

[73] Assignee: Kabushiki Kaisha Toshiba, Kawasaki, Japan

[21] Appl. No.: 08/619,251

[22] Filed: Mar. 21, 1996

[30] Foreign Application Priority Data

Mar. 22, 1995 [JP] Japan .................................. 7-063097
Mar. 18, 1996 [JP] Japan .................................. 8-061353

[51] Int. Cl.$^6$ .................................................. H04B 10/00
[52] U.S. Cl. ........................... 359/133; 359/110; 359/177
[58] Field of Search .................................. 359/110, 173, 359/175, 177, 167, 179, 133

[56] References Cited

U.S. PATENT DOCUMENTS

| | | | |
|---|---|---|---|
| 5,500,756 | 3/1996 | Tsushima et al. | 359/177 |
| 5,546,213 | 8/1996 | Suyama | 359/179 |
| 5,589,970 | 12/1996 | Lyu et al. | 359/110 |
| 5,703,711 | 12/1997 | Hamada | 359/177 |
| 5,706,112 | 1/1998 | Morita | 359/110 |
| 5,768,312 | 6/1998 | Imamura | 359/110 |

FOREIGN PATENT DOCUMENTS 5 63642  3/1993  Japan .

OTHER PUBLICATIONS

IEICI Trans. Commun., vol. E76–B, No. 9, pp.1136–1144, Sep. 1993, Toshiyuki Tsuchiya et al., "Major Factors Affecting Fiber–Optic Transmission System Design for Radio Base Stations".

*Primary Examiner*—Rafael Bacares
*Attorney, Agent, or Firm*—Oblon, Spivak, McClelland, Maier & Neustadt, P.C.

[57] ABSTRACT

A wavelength division multiplexing optical transmission apparatus comprises an optical wavelength demultiplexer which demultiplexes, for each wavelength, the wavelength division multiplex optical signal transmitted via an optical fiber, receivers which receive the output beams from the optical wavelength demultiplexer, a wavelength detector that detects the difference between the wavelength of a transmitter and a wavelength minimizing the loss in the optical wavelength demultiplexer, and an alarm generator that determines an abnormality when the wavelength difference has exceeded an allowable value and raises the alarm.

13 Claims, 21 Drawing Sheets

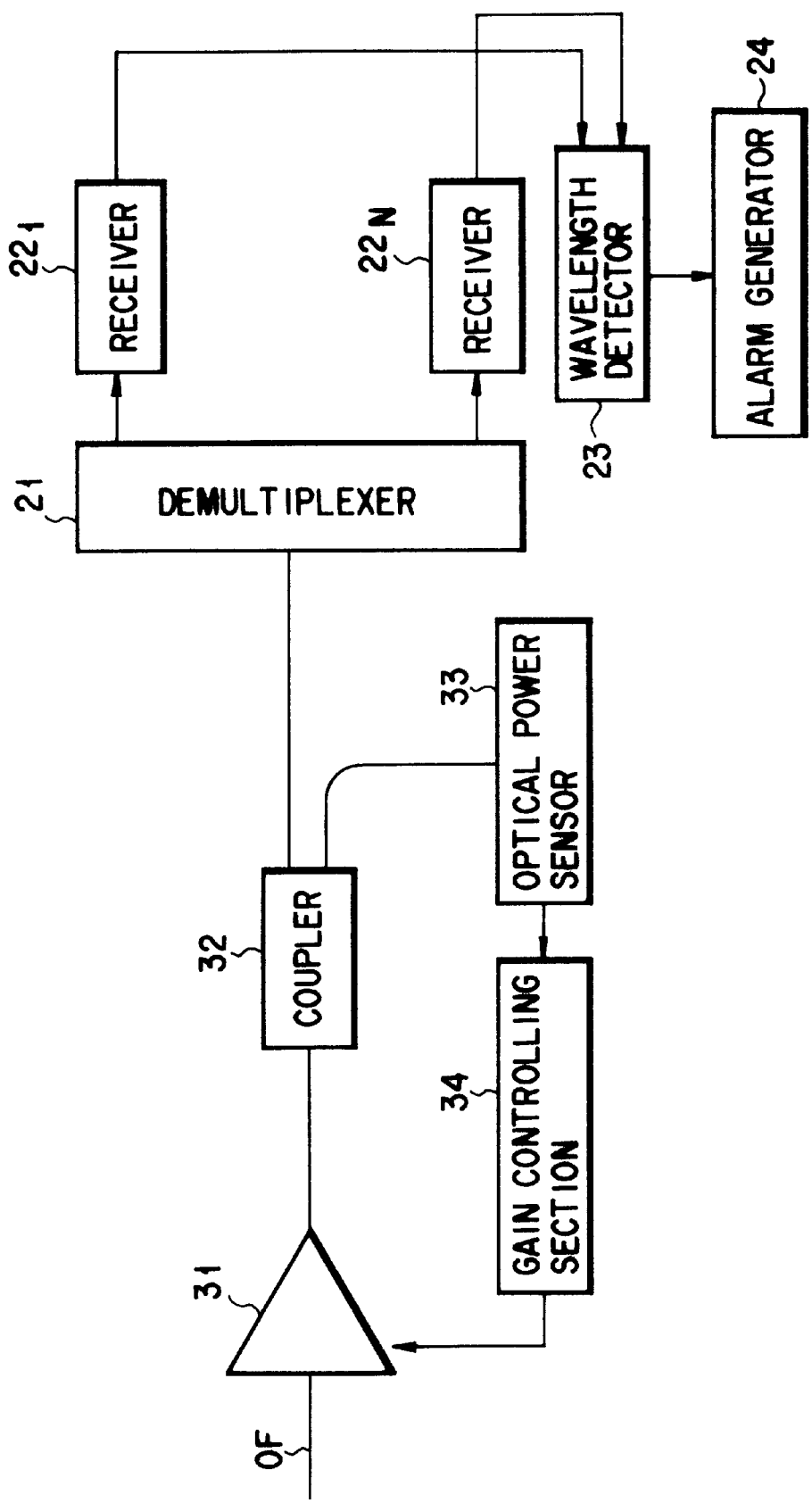
F I G. 5

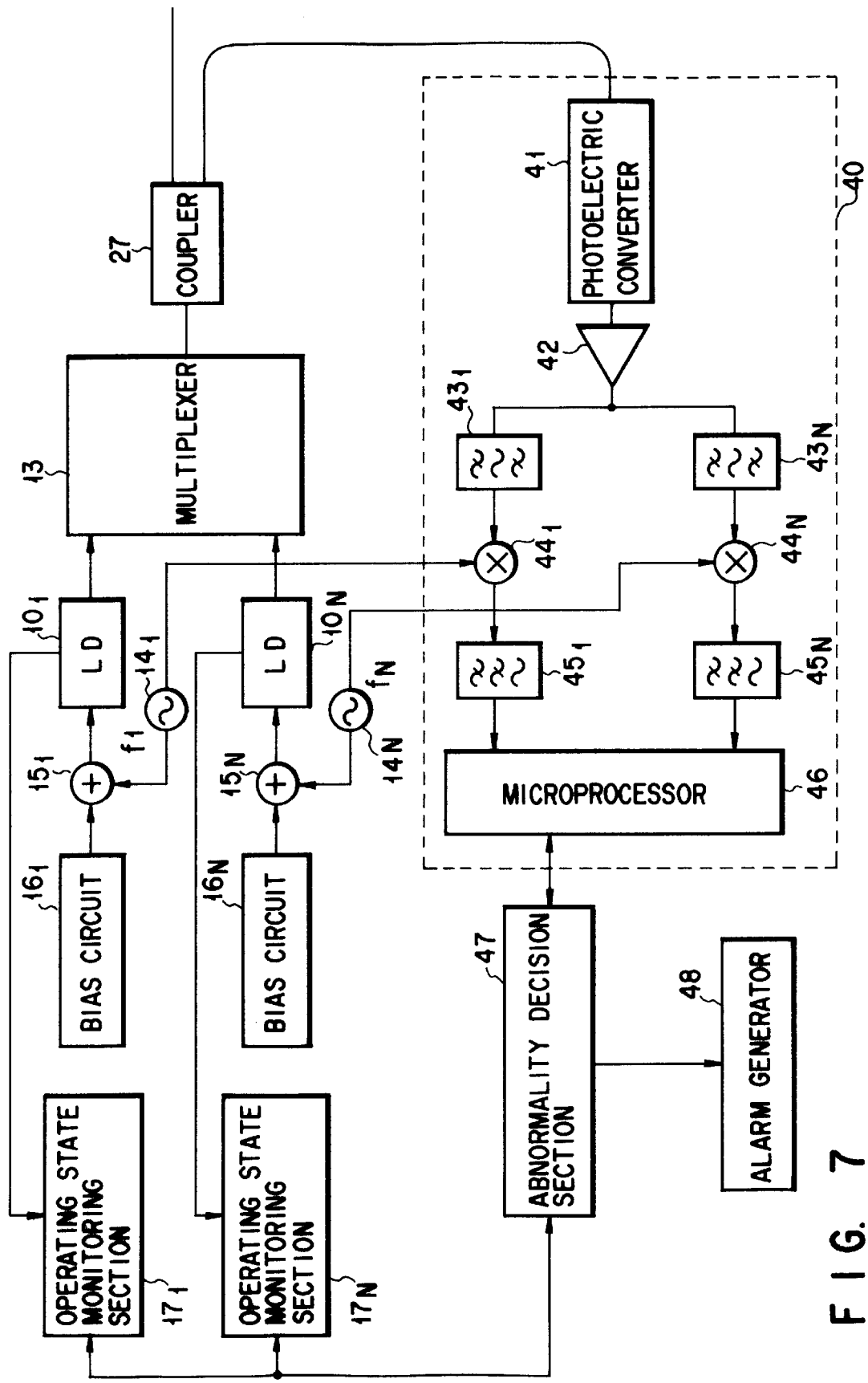
F I G. 7

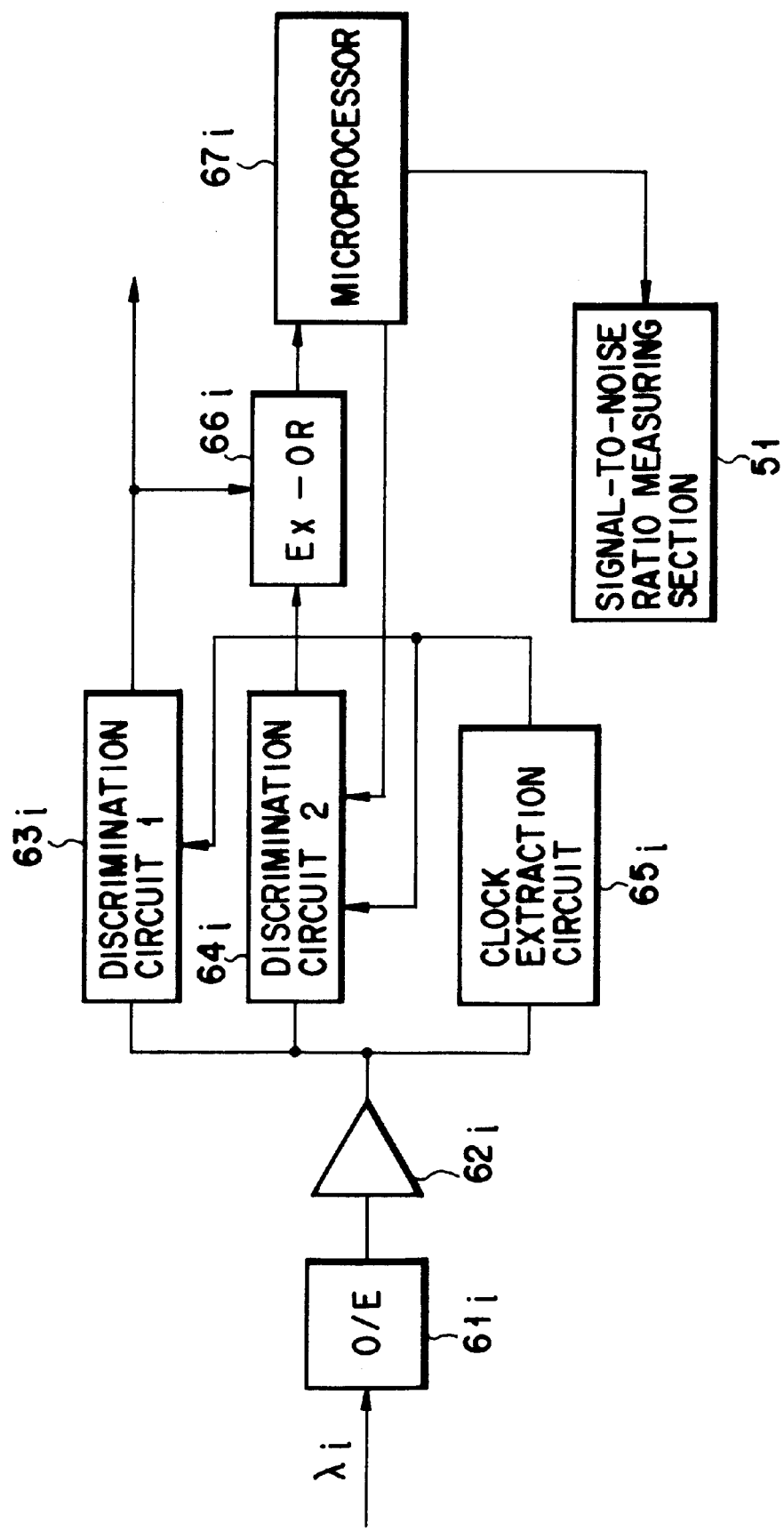
F I G. 12

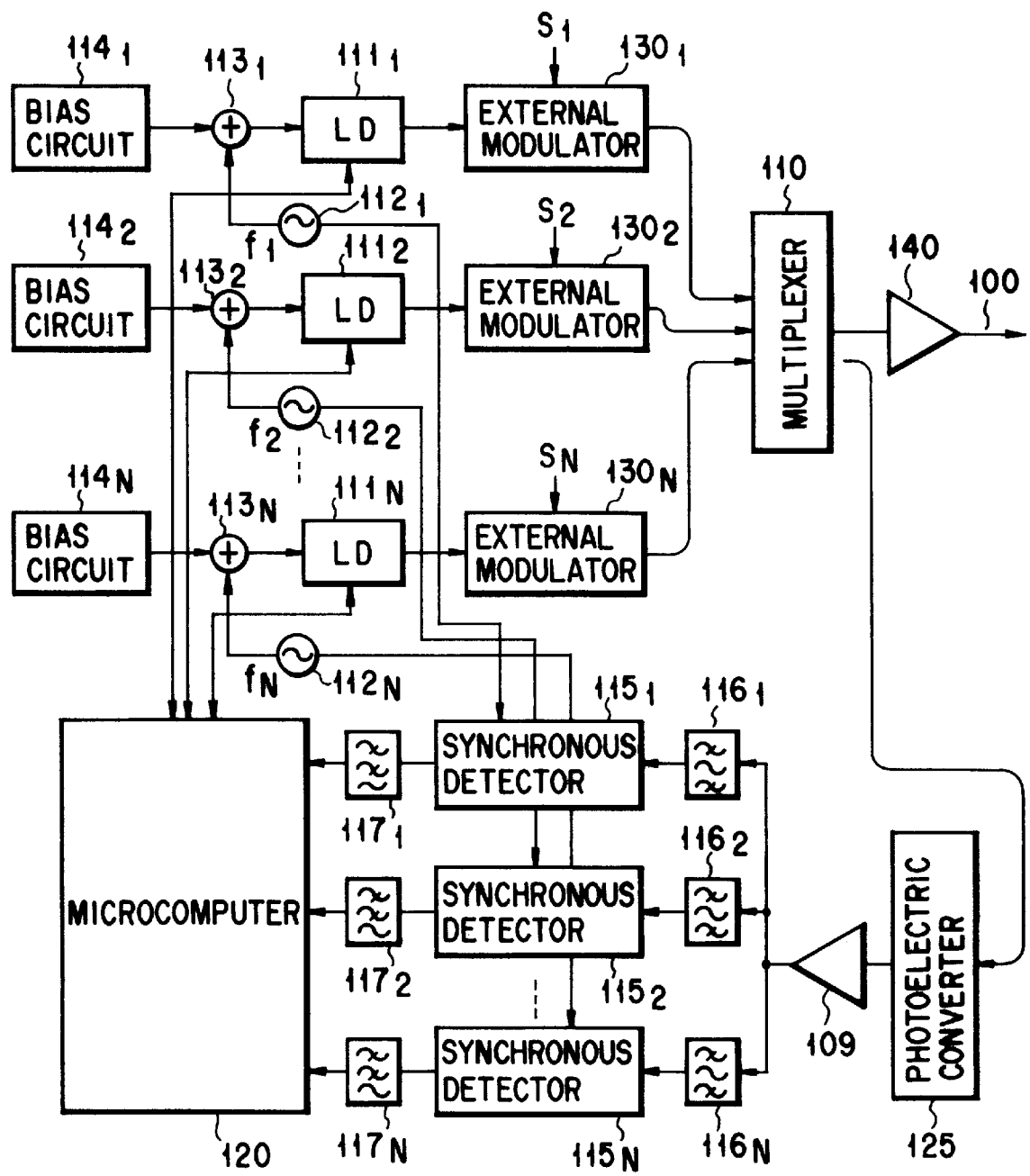
F I G. 14

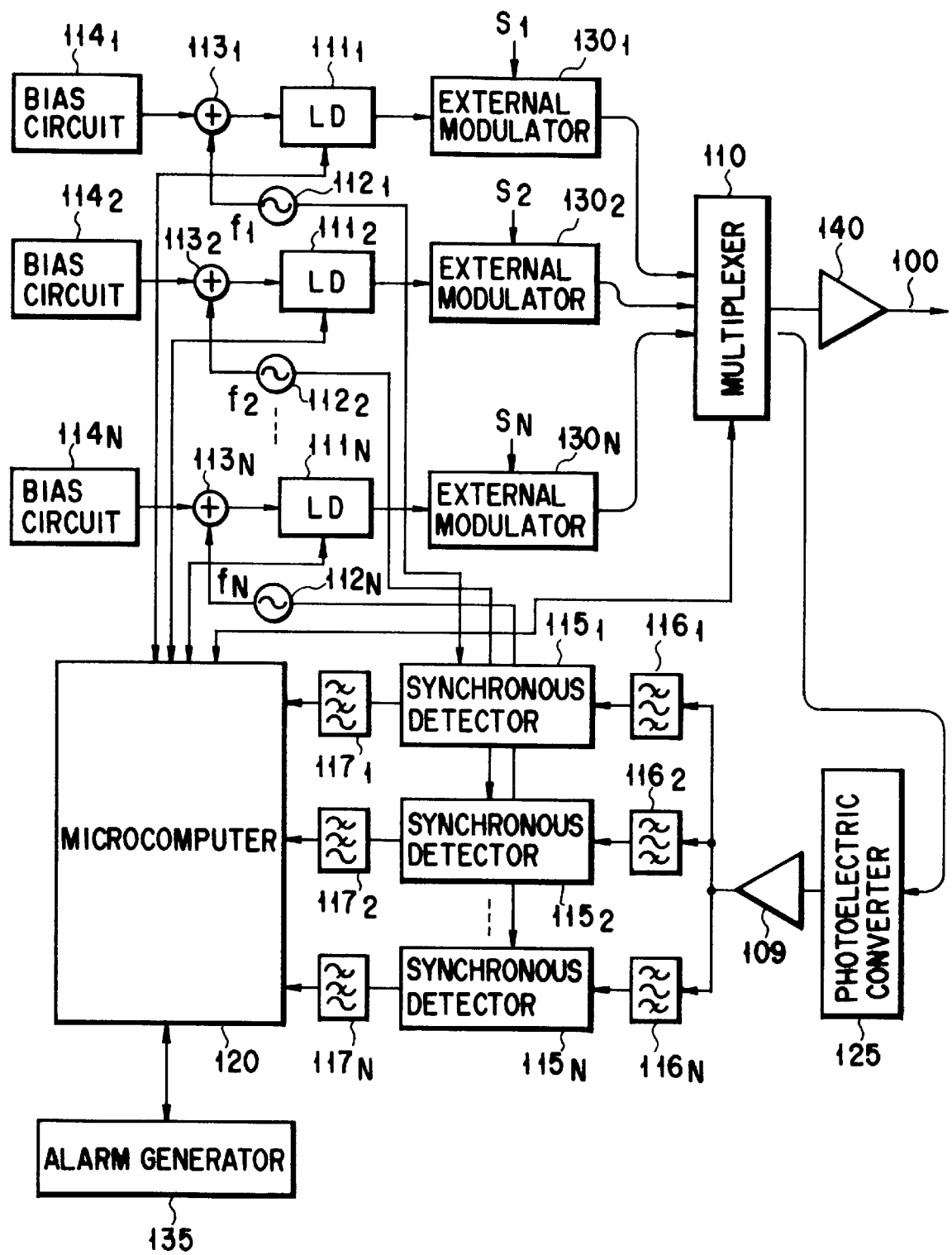
F I G. 19

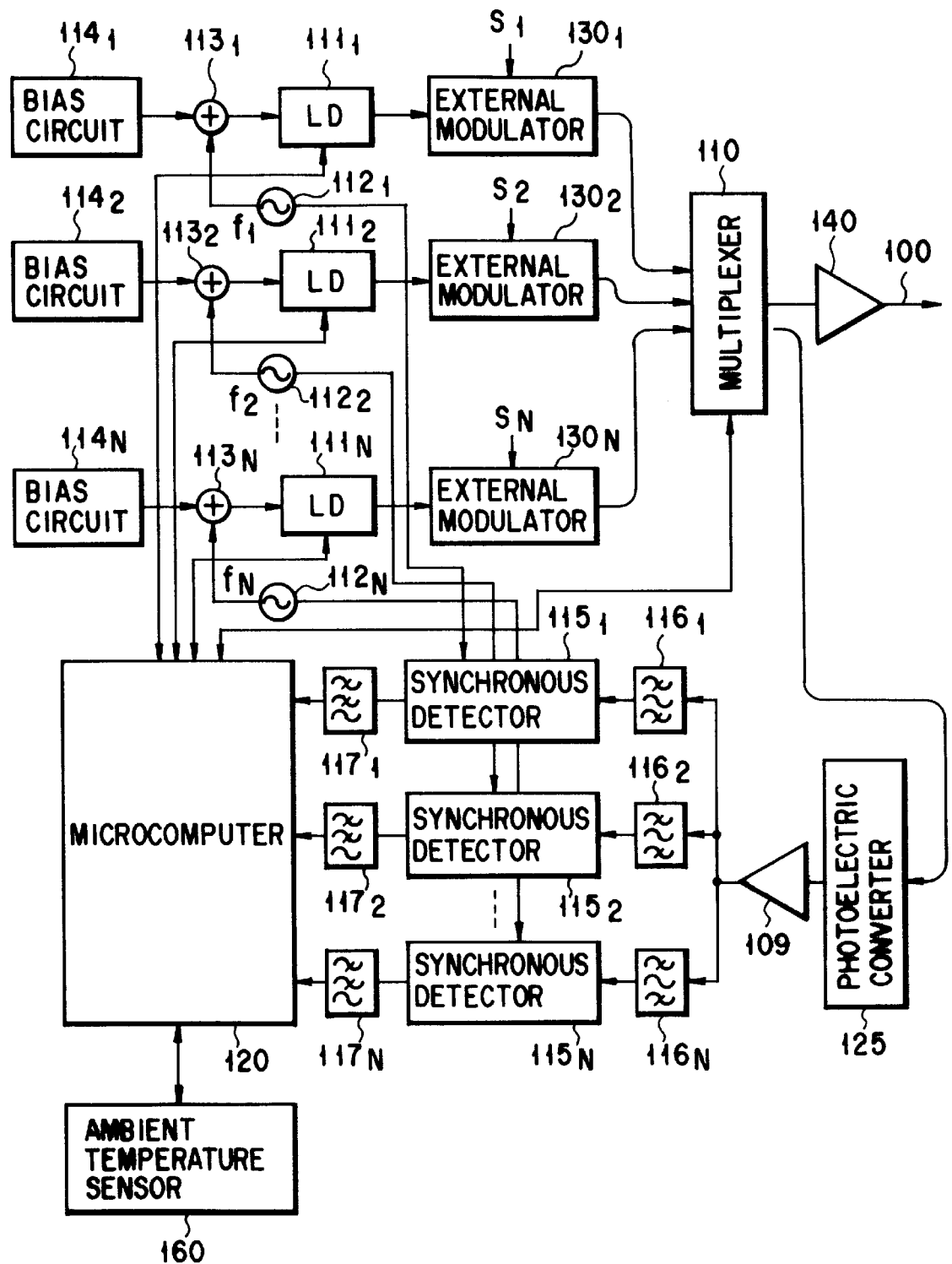
F I G. 21

WAVELENGTH DIVISION MULTIPLEXING OPTICAL TRANSMISSION APPARATUS AND OPTICAL REPEATER

BACKGROUND OF THE INVENTION

1. Field of the Invention

This invention relates to an optical transmission system using wavelength division multiplexing (WDM) techniques, and more particularly to a wavelength division multiplexing optical transmission apparatus and an optical repeater used therewith.

2. Description of the Related Art

With the recent advances in optical fiber amplifiers, tremendous research effort has been directed toward long-distance, large-capacity transmission. In such research activities, a wavelength multiplexing optical transmission system has been attracting attention as a very attractive system because it is capable of increasing the overall transmission capacity remarkably by multiplexing optical signals in the wavelength region without increasing the transmission capacity per channel.

When optical signals are multiplexed very density on an axis of wavelength (or frequency), fluctuations in the wavelength of the transmitter and the wavelength characteristics of the optical wavelength multiplexer/demultiplexer result in the deterioration of receiver sensitivity. Therefore, monitoring the wavelength throughout the entire system including the transmitter and receiver is an essential technique.

The monitoring of wavelength of the transmitter has been effected by monitoring the operating temperature, injection current, and output power of a semiconductor laser used as a light source. Only these pieces of monitoring information are insufficient to cope with the deterioration of a semiconductor laser with age.

To overcome this problem, a method has been proposed which uses an optical resonator as a wavelength reference unit to monitor the wavelength of the semiconductor laser and performs feedback control of the injection current and operating temperature to stabilize the wavelength of the semiconductor laser (e.g., as disclosed in Jpn. Pat. Appln. KOKAI Publication No. 64-15992). In such wavelength stabilization, the output beams of the semiconductor lasers are multiplexed by an optical coupler, which then transmits a wavelength division multiplex optical signal to an optical fiber and couples part of the signal to a Mach-Zehnder interferometer. On the basis of the output light from the Mach-Zehnder interferometer, the wavelengths of the semiconductor lasers are controlled in unison.

With such wavelength stabilization, however, because no measures have been taken against the instability of wavelength stabilizing control, the deviation of the wavelength of the transmitter due to the unstable control will degrade the receiver sensitivity. In wavelength division multiplexing transmission, an optical filter for demultiplexing the individual wavelengths is essential to the receiver section and the stability of the filter's wavelength characteristic is very important in terms of receiver sensitivity. Taking these things into consideration, the approach has been proposed of controlling the transmission wavelength characteristic of an optical filter so that the received power may be maximal after the demultiplexing at the optical filter (e.g., as disclosed in Jpn. Pat. Appln. KOKAI Publication No. 6-222237).

With the conventional method of controlling the transmission wavelength characteristic of an optical filter, fluctuations in the wavelength of transmitters causes the transmission wavelength characteristic of the optical filter to fluctuate, which results in an increase in the crosstalk between channels, causing the problem of degrading the receiver sensitivity. Furthermore, with the conventional wavelength division multiplexing transmission apparatus, since no measures have been taken against the instability of wavelength stabilizing operation at the transmitter section, the deterioration of the receiver sensitivity will occur when the wavelength control becomes unstable.

Furthermore, since the transmission wavelength characteristic of the optical filter that demultiplexes the wavelength division multiplex optical signal for each wavelength is stabilized to the wavelength of the transmitter at the receiver section, the deviation of wavelength of the transmitter would cause the crosstalk between channels to increase, leading to the deterioration of receiver sensitivity.

Furthermore, with the conventional wavelength division multiplexing apparatus, in stabilizing the wavelength of the semiconductor laser, all of the wavelengths of the semiconductor lasers are controlled in unison using an optical element, such as a Mach-Zehnder interferometer, as a wavelength reference, causing the problem that the wavelength capture range is limited to less than the channel spacing.

Furthermore, since the wavelength characteristic of such an optical element as a Mach-Zehnder interferometer depends on temperature, it is difficult to provide stable wavelength control because of the influence of ambient temperature change. In addition, since a conventional semiconductor laser presents a very small frequency modulation efficiency in the frequency range of several kHz to several hundred kHz, the frequency modulation does hot work well in that range, leading to the problem of being unable to stabilize the wavelength.

Furthermore, with conventional optical repeaters that amplify wavelength division multiplex optical signals, the gain per channel of optical fiber amplifier differs, depending on the number of optical signals multiplexed, causing the problem of degrading the receiver sensitivity.

SUMMARY OF THE INVENTION

An object of the present invention is to provide a wavelength division multiplexing optical transmission apparatus which raises the alarm for abnormality when the difference between the wavelength of the transmitter and a wavelength minimizing the loss in the optical wavelength demultiplexer has exceeded an allowable value and thereby prevents the receiver sensitivity from deteriorate due to the wavelength fluctuation.

Another object of the present invention is to provide a wavelength division multiplexing optical transmission apparatus which causes the transmitting section to sense an abnormality in the wavelength of the transmitter and thereby prevents the receiver sensitivity to deteriorated due to the wavelength fluctuation.

Still another object of the present invention is to provide a wavelength division multiplexing optical transmission apparatus which has the function of monitoring the wavelength of the transmitter and the transmission wavelength characteristic of the optical wavelength multiplexer/demultiplexer and deciding the abnormal place by causing the transmitter section and receiver section to exchange the monitoring information with each other, when the difference of the wavelength has exceeded an allowable value.

Still another object of the present invention is to provide a wavelength division multiplexing optical transmission apparatus which controls the wavelength of the transmitter so that the signal-to-noise ratio at the receiver section may be maximal and thereby maintains the best performance of the receiver where the crosstalk between channels is always suppressed.

Still another object of the present invention is to provide a wavelength division multiplexing optical transmission apparatus which is capable of continuing to provide service even when an abnormality has occurred in the wavelength of the transmitter during service.

Still another object of the present invention is to provide a wavelength division multiplexing optical transmission apparatus which has a wavelength stabilizing mechanism that neither restricts the wavelength capture range of semiconductor laser to the channel spacing, nor depends on the frequency at which the semiconductor laser has been modulated to stabilize the wavelength.

Still another object of the present invention is to provide a wavelength division multiplexing optical transmission apparatus which suppresses the wavelength fluctuation of the semiconductor lasers and wavelength multiplexer/demultiplexer against the ambient temperature change.

Still another object of the present invention is to provide an optical repeater which make it possible to receive the optical signals stably without depending on the number of optical signals multiplexed in the wavelength division multiplex optical signal.

According to the present invention, there is provided a wavelength division multiplexing optical transmission apparatus basically characterized by comprising an optical wavelength demultiplexer for demultiplexing, for each wavelength, a wavelength division multiplex signal transmitted via an optical fiber, a receiver for receiving the optical output of the optical wavelength demultiplexer, a wavelength detector for detecting the difference between a wavelength minimizing the loss in the optical wavelength demultiplexer and a wavelength of a transmitter and outputting a signal proportional to the wavelength difference; and a decision section for determining an abnormality when the wavelength difference has exceeded an allowable value and notifying the abnormality.

According to the present invention, there is provided a wavelength division multiplexing optical transmission apparatus comprising a plurality of semiconductor lasers having different wavelengths, a first monitoring section for monitoring the operating state of the semiconductor lasers, a wavelength reference unit serving as references of wavelengths of the semiconductor lasers, a second monitoring section for monitoring the wavelength difference between the wavelengths of the semiconductor lasers and the wavelength reference unit, and a decision section for determining an abnormality on the basis of the monitoring information from the first and second monitoring means, when the wavelength difference monitored at the second monitoring means has exceeded an allowable value.

According to the present invention, there is provided a wavelength division multiplexing optical transmission apparatus comprising: a plurality of semiconductor lasers having different oscillation wavelengths, a first monitoring section for monitoring the operating state of the semiconductor lasers, an optical wavelength multiplexer for multiplexing the output beams from the semiconductor lasers to produce a wavelength division multiplex optical signal, an optical wavelength demultiplexer for demultiplexing, for each wavelength, the wavelength division multiplex optical signal transmitted via an optical fiber, a receiver for receiving the optical output from the optical wavelength demultiplexer, a first wavelength detector for detecting the difference between a wavelength minimizing the loss in the optical wavelength demultiplexer and a wavelength of the semiconductor laser, a first decision section for determining an abnormality when the wavelength difference has exceeded an allowable value; and a decision section for determining on the basis of the monitoring information from the first monitoring section and the output signal from the wavelength detector whether either the transmitting side or the receiving side is abnormal, when the first decision section has determined an abnormality.

According to the present invention, the above wavelength division multiplexing optical transmission apparatus further comprises a wavelength reference unit serving as references for wavelengths of the semiconductor lasers, a second monitoring section for monitoring the wavelength difference between the wavelengths of the semiconductor lasers and the wavelength reference unit, a second decision section for determining an abnormality on the basis of the monitoring information from the first and second monitoring sections, when the wavelength difference monitored at the second monitoring means has exceeded an allowable value, and a decision section for determining on the basis of the monitoring information from the first and second monitoring sections and the output signal from the wavelength detector whether either the transmitting side or the receiving side is abnormal, when the first decision section has determined an abnormality.

According to the present invention, the above wavelength division multiplexing transmission apparatus further comprises an optical wavelength multiplexer for multiplexing the output beams from the semiconductor lasers to produce a wavelength division multiplex optical signal, a second wavelength detector for detecting the wavelengths of the semiconductor lasers from the optical output signal of the multiplexing means, and a control circuit for controlling the wavelength of the semiconductor laser to a wavelength minimizing the loss in the optical wavelength multiplexer on the basis of the output of the second wavelength detector.

According to the present invention, there is provided a wavelength division multiplexing optical transmission apparatus comprising a plurality of semiconductor lasers having different wavelengths, an optical wavelength multiplexer for multiplexing the output beams of the semiconductor lasers to produce a wavelength division multiplex optical signal, an optical wavelength demultiplexer for demultiplexing, for each wavelength, the wavelength division multiplex optical signal transmitted via an optical fiber, a receiver for receiving the optical output from the optical wavelength demultiplexer, a sensing section for sensing the signal-to-noise (S/N) ratio in the receiver, and a control circuit for controlling the wavelength of the transmitter so as to maximize the sensed signal-to-noise ratio of the semiconductor laser.

According to the present invention, there is provided a wavelength division multiplexing optical transmission apparatus comprising a plurality of semiconductor lasers having different wavelengths, a spare semiconductor laser having a wavelength different from those of the semiconductor lasers, an optical wavelength multiplexer for multiplexing the output beams from the semiconductor lasers to produce a wavelength division multiplex optical signal, an optical fiber for transmitting the wavelength division multiplex optical signal, an optical wavelength demultiplexer for demultiplexing the wavelength division multiplex optical signal for each wavelength, a wavelength detector for detecting the difference between a wavelength minimizing the loss in the optical wavelength demultiplexer and the wavelengths of the semiconductor laser, a decision section for determining an abnormality when the wavelength difference has exceeded an allowable value, and a switching section for switching the transmission signal to the spare semiconductor laser when the decision section has determined an abnormality.

According to the present invention, there is provided a wavelength division multiplexing optical transmission apparatus comprising a plurality of semiconductor lasers having different wavelengths, a plurality of alternating-current signal sources which are provided so as to generate alternating-current signals with different frequencies corresponding to the plurality of semiconductor lasers, modulation means for intensity-modulating the output beam of each of the semiconductor lasers on the basis of the alternating-current signals from the alternating-current signal sources, a multiplexing means for multiplexing the output beams form the semiconductor lasers to produce a wavelength division multiplex optical signal, photoelectronic conversion means for receiving part of the wavelength division multiplex optical signal from the multiplexing means and converting it into an electric signal, extracting means for extracting the frequency components of the alternating-current signals generated at the plurality of alternating-current signal sources from the photoelectric conversion means, control means for controlling the wavelength of each of the semiconductor lasers to a wavelength minimizing the loss in the multiplexing means on the basis of the frequency components extracted at the extracting means.

According to the present invention, a wavelength division multiplexing optical transmission apparatus is provided with a control section that, in addition to a first control function of controlling the wavelength of each of the semiconductor lasers to a wavelength minimizing the loss in the optical wavelength multiplexer, has a second control function of controlling a transmission wavelength characteristic of the optical wavelength multiplexer, when more than a specified number of the plurality of semiconductor lasers are controlled in the same direction in wavelength control of the semiconductor lasers by the first control function.

According to the present invention, a wavelength division multiplexing transmission optical apparatus is provided with a control section that, in addition to a first control function of controlling the wavelength of each of the semiconductor lasers to a wavelength minimizing the loss in the optical wavelength multiplexer, has a second control means of sensing ambient temperature and controlling the optical wavelength multiplexer so that the temperature characteristic of the optical wavelength multiplexer may be compensated on the basis of fluctuations in the ambient temperature.

Furthermore, according to the present invention, there is provided an optical repeater comprising an optical fiber amplifier for amplifying a wavelength division multiplex optical signal transmitted via a wavelength division multiplexing optical transmission apparatus, a photoelectric conversion section for receiving part of the output of the optical fiber amplifier and converting it into an electric signal, an extracting section for extracting the frequency components of the alternating-currents generated at a plurality of alternating-current signal sources in the wavelength division multiplexing optical transmission apparatus from the output signal from the photoelectric conversion section, a plurality of sensing sections for sensing the power of each frequency component extracted at the extracting section, and a control section for controlling the gain of the optical fiber amplifier on the basis of the outputs of the sensing sections.

A wavelength division multiplexing optical transmission apparatus of the present invention monitors the wavelength difference between the wavelength of the transmitter and a wavelength minimizing the loss in the optical wavelength demultiplexer. If the wavelength minimizing the loss in the optical wavelength demultiplexer coincides with the wavelength of the transmitter, the deterioration of the receiver sensitivity due to the crosstalk between channels can be minimized. Therefore, by generating an abnormality signal when the wavelength difference has exceeded the allowable value, it is possible to prevent the receiver sensitivity from deteriorating due to the wavelength fluctuation.

A wavelength division multiplexing optical transmission apparatus of the invention monitors not only the operating states including the operating temperature, injection current, and output power of the semiconductor lasers used as light sources in the transmitter section, but also the wavelength of each semiconductor laser using a wavelength reference unit. If finding an abnormality in the operating state of a semiconductor laser when the wavelength difference between the semiconductor laser and the wavelength reference unit has exceeded an allowable value, the apparatus can determine that the semiconductor laser is abnormal. If there is no abnormality in the operating state of the semiconductor lasers, the apparatus can determine that the wavelength reference unit is abnormal. Therefore, the apparatus can determine whether the wavelength of a semiconductor laser is abnormal or the wavelength reference unit is abnormal.

A wavelength division multiplexing optical transmission apparatus of the invention monitors the operating states including the operating temperature, injection current and output power of the semiconductor lasers used as light sources in the transmitter section. In addition, the receiver section monitors the difference between the wavelength of the semiconductor laser and a wavelength minimizing the loss in the optical wavelength demultiplexer. When the receiver section has sensed the wavelength difference, it can be determined that the transmitter section is abnormal when an abnormality has been found in the operating state of the semiconductor laser, otherwise it can be determined that the receiver section is abnormal. Therefore, by making a comprehensive judgment from these pieces of monitoring information, it is possible to determine the abnormal place.

Furthermore, the transmitter section uses a wavelength reference unit to monitor the wavelength of each semiconductor laser. By adding the monitoring information to the data for judgment, the accuracy of determining an abnormal point can be improved.

With a wavelength division multiplexing optical transmission apparatus of the invention, the receiver section monitors the signal-to-noise ratio of the received signal, which is an important parameter to determine receiver sensitivity. By controlling the wavelength of the transmitter so that the signal-to-noise ratio may be maximal, the best performance of the receiver with less crosstalk between channel can be achieved.

A wavelength division multiplexing optical transmission apparatus of the invention switches service to a spare transmitter having another wavelength, when an abnormality has occurred in the wavelength of the transmitter during service. Accordingly, even if an abnormality occurs in the wavelength of the transmitter during service, the service can be continued.

A wavelength division multiplexing optical transmission apparatus of the invention uses the transmission characteristic of the optical wavelength multiplexer as a wavelength reference. The optical wavelength multiplexer multiplexes the optical signals inputted to a plurality of input ports to produce a wavelength division multiplexed optical signal, which is supplied to a single output port, when viewed from one input port to the output port, there is only one wavelength minimizing the loss. This prevents the wavelength capture range of the semiconductor laser from being restricted by the channel spacing and assures the capture range over a wider frequency band.

Furthermore, with the invention, to stabilize the wavelength, each semiconductor laser undergoes intensity modulation. Since the intensity modulation efficiency of a conventional semiconductor laser is constant over a wide frequency range, the efficiency does not depend on the frequency of the modulation signal used to modulate the semiconductor laser.

Furthermore, when the wavelengths of more than a specified number of those of the semiconductor lasers subjected to wavelength control have been shifted to the long wavelength side or the short wavelength side, it is judged that the wavelength characteristic of the optical wavelength multiplexer serving as a wavelength reference has been shifted. Then, the alarm is raised or the wavelength characteristic of the optical wavelength multiplexer is controlled. This keeps the wavelength reference constant and enables stable wavelength control.

Still furthermore, with the present invention, by sensing ambient temperature and compensating the temperature characteristic of the optical wavelength optical wavelength multiplexer according to ambient temperature change, it is possible to provide stable wavelength control against fluctuations in ambient temperature change.

In addition, an optical repeater according to the present invention senses the power of each optical signal multiplexed in the wavelength division multiplex optical signal. By controlling the gain of the optical fiber amplifier on the basis of the sensed power, the received optical power is constant, regardless of the number of optical signals multiplexed, which make the receiver performance stable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a block diagram of the receiver section in a wavelength division multiplexing optical transmission apparatus according to a fifth embodiment of the present invention;

FIG. 7 is a block diagram of the transmitter section in a wavelength division multiplexing optical transmission apparatus according to a seventh embodiment of the present invention;

FIG. 12 is a block diagram of a signal-to-noise ratio measuring system used in a wavelength division multiplexing optical transmission apparatus according to a twelfth embodiment of the present invention;

FIG. 14 is a block diagram of the transmitter section in a wavelength division multiplexing optical transmission apparatus according to a fourteenth embodiment of the present invention;

FIG. 19 is a block diagram of the transmitter section in a wavelength division multiplexing optical transmission apparatus according to a sixteenth embodiment of the present invention;

FIG. 21 is a block diagram of the transmitter section in a wavelength division multiplexing optical transmission apparatus according to a seventeenth embodiment of the present invention;

DETAILED DESCRIPTION OF THE PREFERRED EMBODIMENTS

Hereinafter, referring to the accompanying drawings, embodiments of the present invention will be explained.

Figure 1:
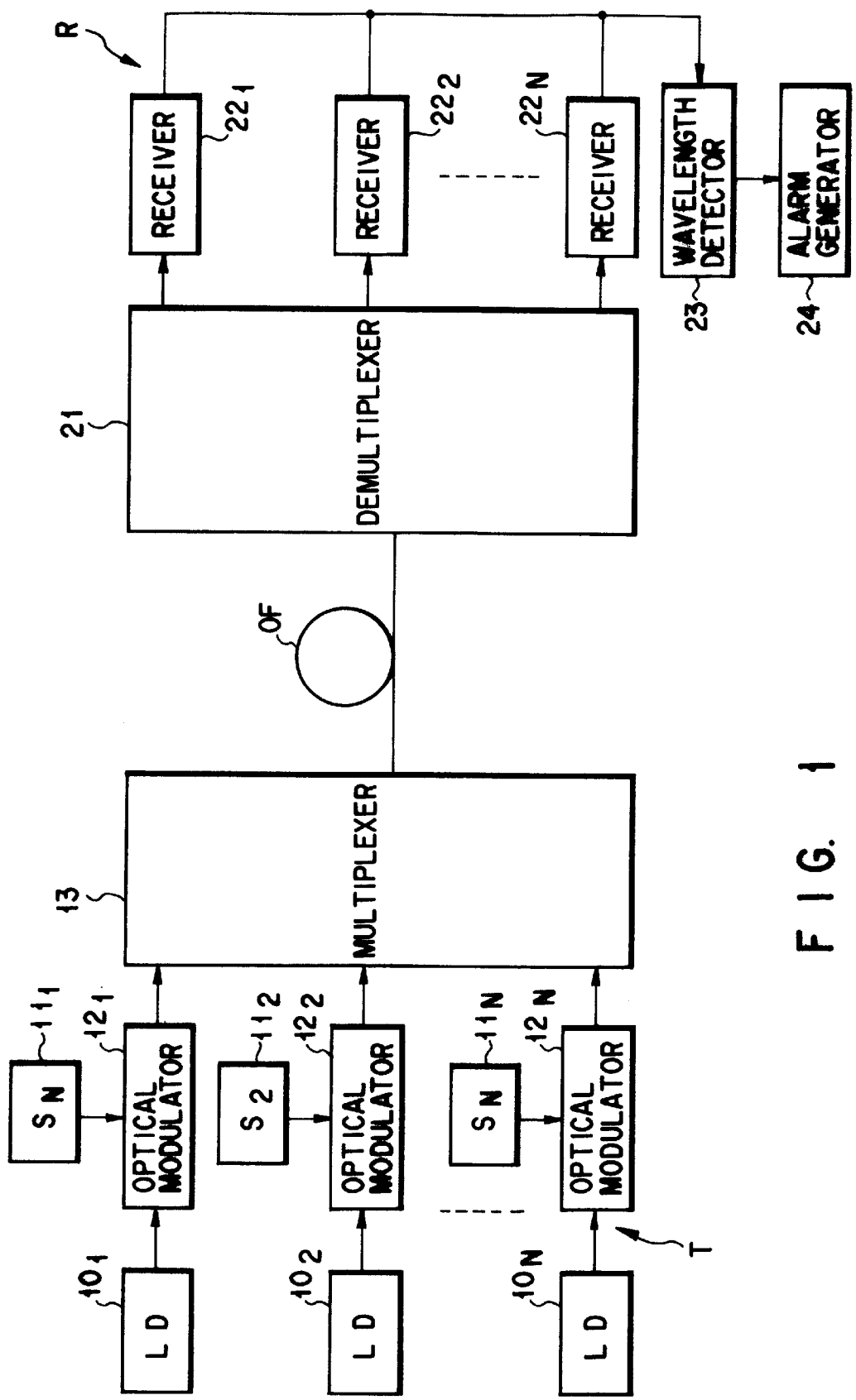
FIG. 1 is a block diagram of a wavelength division multiplexing optical transmission apparatus according to a first embodiment of the present invention.

In a wavelength division multiplexing optical transmission apparatus according to a first embodiment of the present invention shown in FIG. 1, a transmitter section T is coupled with a receiver section R by means of an optical fiber OF. The transmitter section T comprises a plurality of semiconductor lasers (e.g., laser diodes (LD)) $10_1$, $10_2$, ..., $10_N$ which output laser beams of different wavelengths, respectively, a plurality of optical modulators $12_1$, $12_2$, ..., $12_N$ which are optically coupled with the respective semiconductor lasers and modulate the laser beams using the data signals $S_1$, $S_2$, ..., $S_N$ from signal sources $11_1$, $11_2$, ..., $11_N$, respectively, and an optical wavelength multiplexer 13 which multiplexes the modulated beams from the optical modulators.

The receiver section R comprises an optical wavelength demultiplexer 21 which receives the multiplexed laser beam sent via the optical fiber OF from the transmitter section T and demultiplexes it for each wavelength and a plurality of receivers $22_1$, $22_2$, ..., $22_N$ which are connected to the respective outputs of the optical wavelength demultiplexer and convert received optical signals with different wavelengths into electric signals. The receiver section R is provided with a wavelength detector 23 which senses the difference Δ between the wavelength of a semiconductor laser and a wavelength minimizing the loss in the optical wavelength demultiplexer 21 on the basis of the transmission wavelength characteristic of the optical wavelength demultiplexer 21 and an alarm generator 24 which raises the alarm when the wavelength difference has exceeded an allowable value.

With the wavelength division multiplexing optical transmission apparatus thus constructed, when the semiconductor lasers (LD) $10_1$, $10_2$, ..., $10_N$ emit output beams of the respective wavelengths $\lambda_1$, $\lambda_2$, ..., $\lambda_N$ to the optical modulators $12_1$, $12_2$, ..., $12_N$, the optical modulators $12_1$, $12_2$, ..., $12_N$ modulate the laser output beams, using the data signals $S_1$, $S_2$, ..., $S_N$, respectively. The modulated beams are inputted to the optical wavelength multiplexer 13, which multiplexes them. The output of the optical wavelength multiplexer 13 is transmitted to the receiver section R via the optical fiber OF.

With the receiver section R, the optical wavelength demultiplexer 21 demultiplexes the wavelength division multiplex optical signal for each wavelength and the demultiplexed signals are received by the receivers $22_1$, $22_2$, ..., $22_N$. Part of the signals received at the receivers $22_1$, $22_2$, ..., $22_N$ are inputted to the wavelength detector 23, which senses the difference Δλ between the wavelength of the semiconductor laser and a wavelength minimizing the loss in the optical wavelength demultiplexer 21 on the basis of the wavelength characteristic of the optical wavelength demultiplexer 21. When the wavelength difference Δλ detected by the wavelength detector 23 has exceeded the allowable value, the wavelength detector 23 sends an abnormality signal to the alarm generator 24, which gives the alarm.

As described above, the wavelength division multiplexing optical apparatus of the present embodiment detects the difference between the wavelength of the semiconductor laser and the wavelength minimizing the loss in the optical wavelength demultiplexer and when the wavelength difference has exceeded the allowable value, raises the alarm, thereby preventing the receiver sensitivity from deteriorating due to the wavelength fluctuation.

Figure 2:
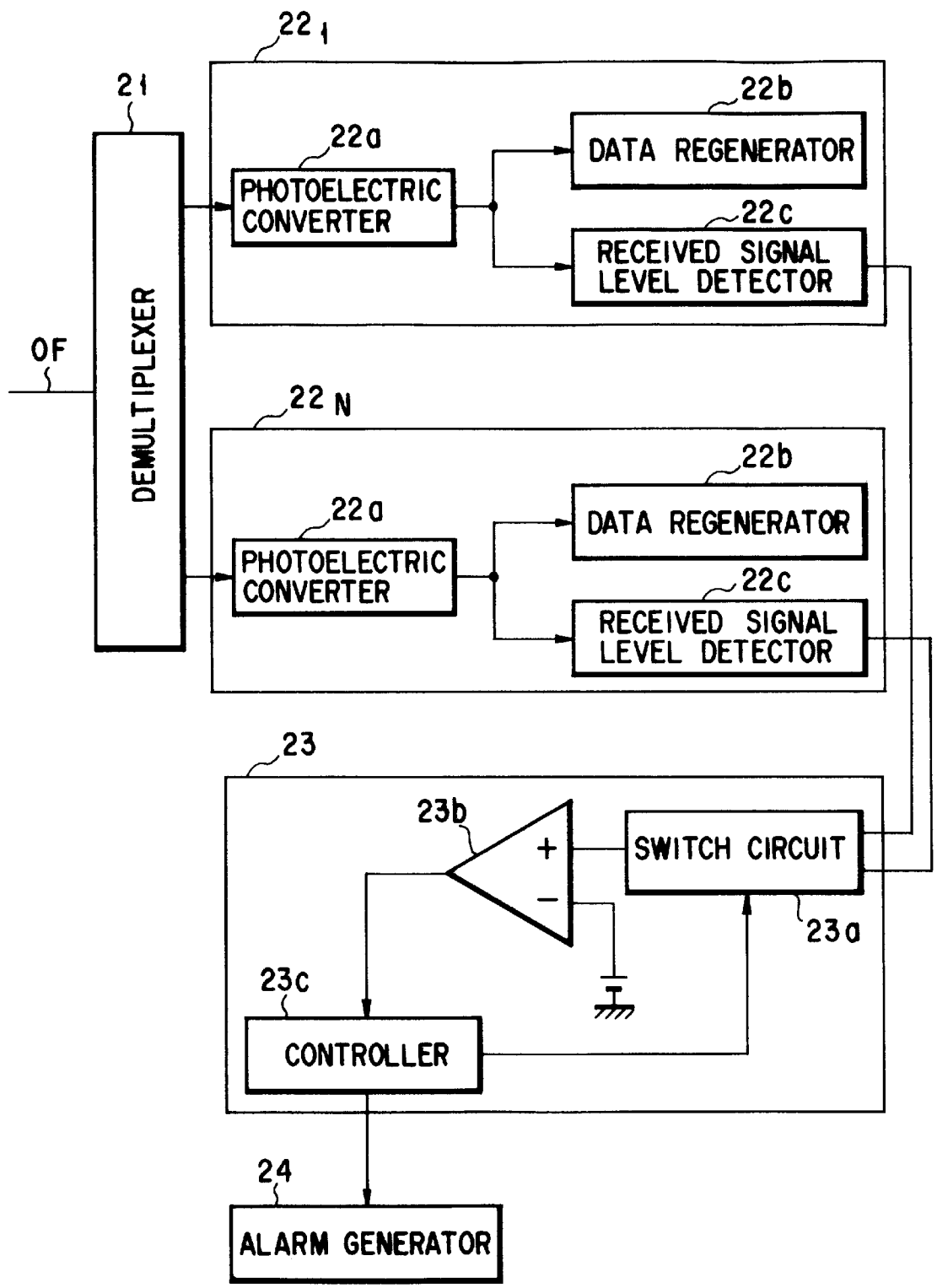
FIG. 2 is a block diagram of the receiver section in a wavelength division multiplexing optical transmission apparatus according to a second embodiment of the present invention.

FIG. 2 shows the receiver section R in a wavelength division multiplexing optical transmission apparatus according to a second embodiment of the present invention. In this embodiment, each of receivers $22_1$, $22_2$, ..., $22_N$ which receive the optical signals from the optical wavelength demultiplexer 21 comprises a photoelectric converter 22a, a data regenerator 22b and a received signal level detector 22c, these two connected to the output terminals of the converter 22a. A wavelength detector 23 is made up of a switch circuit 23a connected to the output terminal of the respective received signal level detector 22c in each of the receivers $22_1$, $22_2$, ..., $22_N$, a comparator 23b which is selectively connected to the receivers via the switch circuit 23a and compares the received signal level with a reference voltage ref, and a controller 23c connected to the output terminal of the comparator 23b.

With the receiver section R thus constructed, the optical signal sent from the transmitter section T via the optical fiber OF is demultiplexed for each wavelength at an optical wavelength demultiplexer 21, which inputs the demultiplexed optical signals to the respective receivers $22_1$, $22_2$, ..., $22_N$. In each receiver, a photoelectric converter 22a converts the demultiplexed optical signal into an electric signal. The output of the photoelectric converter is branched into two signals; one is inputted to the data regenerator 22b, which regenerates the data signal and the other is inputted to the received signal level detector 22c. The received signal level detector 22c detects the received power of the demultiplexed optical signal on the basis of the received signal and outputs a voltage proportional to the received power of the demultiplexed optical signal.

The output signal of the received signal level detector 22c is inputted to the wavelength detector 23. In the wavelength detector 23, the switch circuit 23a selects only one channel according to the control signal from the controller 23c, and the comparator 23b compares the voltage signal of the selected channel with the reference voltage ref corresponding to the allowable value for the wavelength fluctuation. The output of the comparator 23b is inputted to the controller 23c. When the output of the received signal level detector has dropped below the reference voltage, the controller 23c sends an abnormality signal to an alarm generator 24. The alarm generator 24 raises the alarm on the basis of the abnormality signal from the controller 23c.

With the configuration of FIG. 2, the difference between the wavelength of the semiconductor laser and a wavelength minimizing the loss in the optical wavelength demultiplexer 21 can be sensed using the wavelength characteristic of the optical wavelength demultiplexer 21 and thereby the abnormality can be reported.

Figure 3:
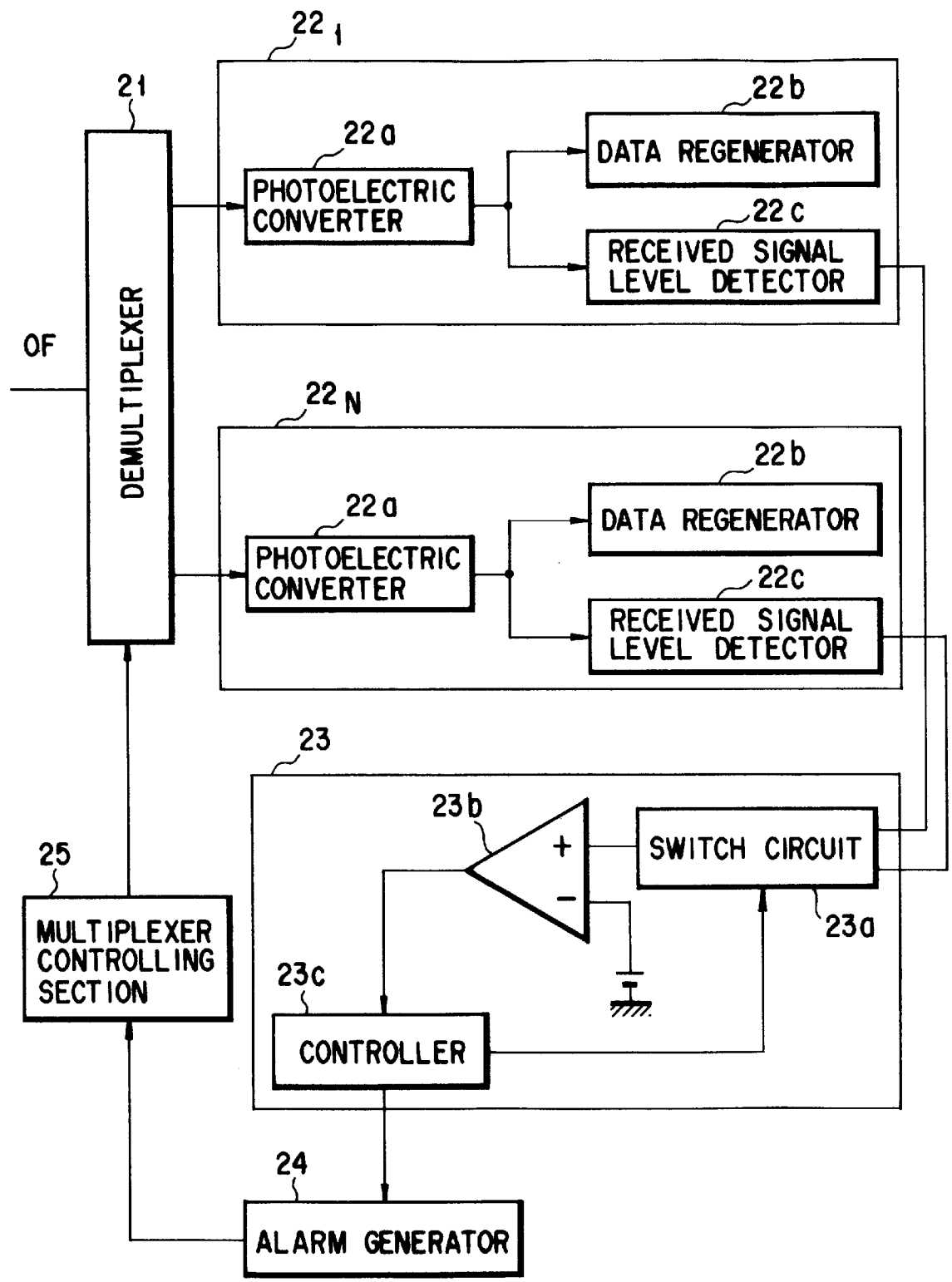
FIG. 3 is a block diagram of the receiver section in a wavelength division multiplexing optical transmission apparatus according to a third embodiment of the present invention.

FIG. 3 shows the receiver R in a wavelength division multiplexing optical apparatus according to a third embodiment of the present invention. The same parts as those in the embodiment of FIG. 2 are indicated by the same reference symbols and their explanation will not be given.

The output of a received signal level detector 22c is inputted to a wavelength detector 23, in which a switch circuit 23a selects only one channel according to the control signal from a controller 23c, and a comparator 23b compares the detection output with a preset voltage. The output of the comparator 23b is inputted to the controller 23c. When the received signal level has become lower than the preset voltage, the controller 23c outputs a control signal to an optical wavelength demultiplexer controlling section 25. The optical wavelength demultiplexer controlling section 25 varies the operating temperature at the optical wavelength demultiplexer 21 according to the control signal from the controller 23c and shifts the wavelength characteristic of the optical wavelength demultiplexer 21 so that the output of the received signal level detector 22c may become maximum. In this case, the optical wavelength demultiplexer 21 is provided with a Peltier element. The Peltier element controls the operating temperature of the optical wavelength demultiplexer 21.

The optical wavelength demultiplexer controlling section 25 supplies to the controller 23c an output voltage corresponding to the amount of change of the operating temperature (the amount of shift of the transmission wavelength characteristic) at the optical wavelength demultiplexer 21. The controller 23c detects the wavelength difference from the output voltage from the optical wavelength demultiplexer controlling section 25 and when the wavelength difference has exceeded an allowable value, outputs an abnormality signal to an alarm generator 24.

With the configuration of the third embodiment, too, the difference between the wavelength of the semiconductor laser and a wavelength minimizing the loss in the optical wavelength demultiplexer can be detected using the wavelength characteristic of the optical wavelength demultiplexer.

Figure 4:
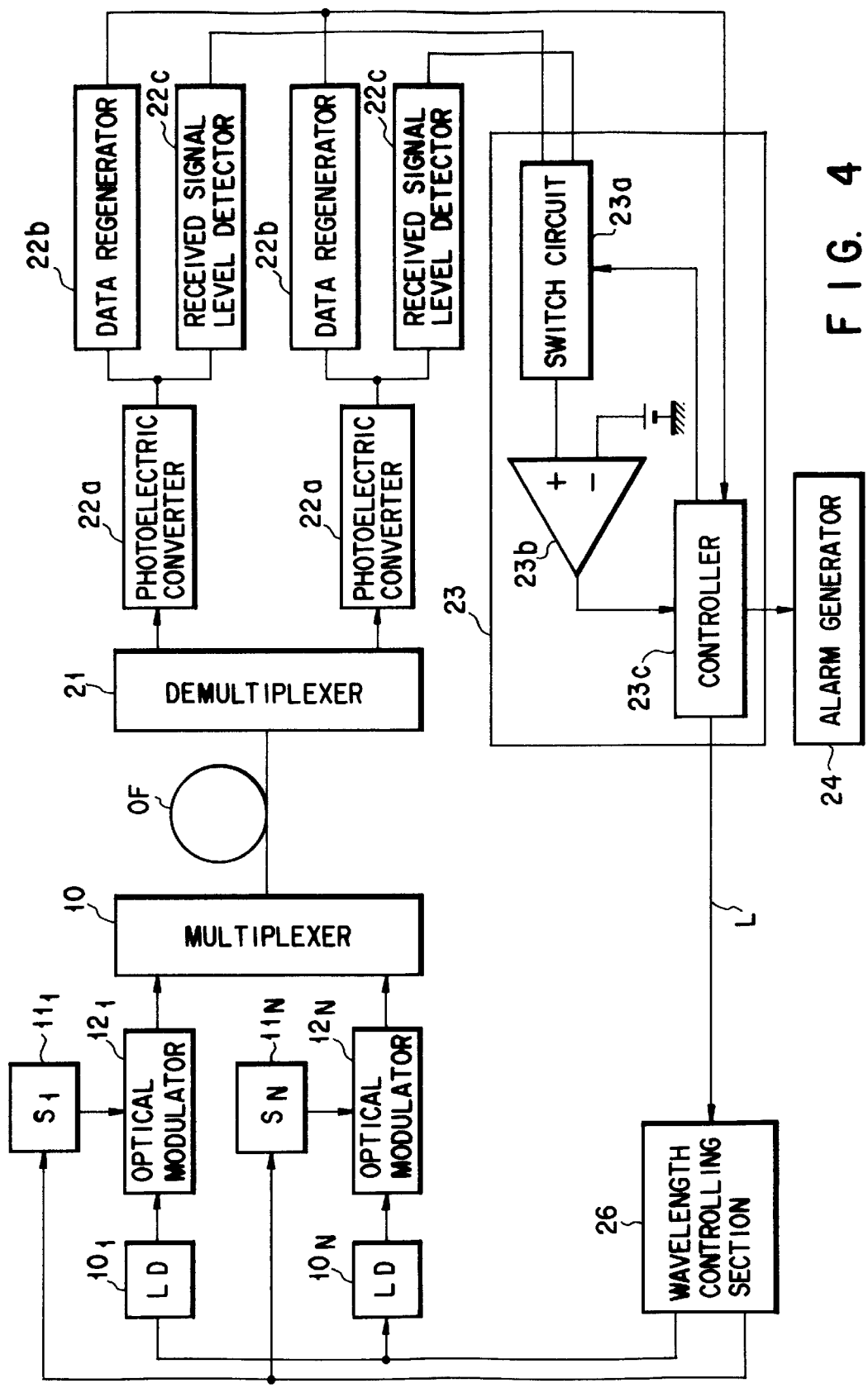
FIG. 4 is a block diagram of a wavelength division multiplexing optical transmission apparatus according to a fourth embodiment of the present invention.

FIG. 4 shows a wavelength division multiplexing optical apparatus according to a fourth embodiment of the present invention. The same parts as those in the embodiments of FIGS. 1 to 3 are indicated by the same reference symbols and their explanation will be omitted.

In this embodiment, the output of the received signal level detector 22c in each receiver is inputted to a wavelength detector 23, in which a switch circuit 23a selects only one channel and a comparator 23b compares the selected signal with a preset voltage. The output of the comparator 23b is inputted to a controller 23c. When the received signal level has dropped below the preset voltage, the controller 23c sends a wavelength control signal to a wavelength controlling section 26 via a control signal special line L.

The wavelength controlling section 26 controls the wavelength according to the wavelength control signal by varying the operating state (e.g., the operating temperature) of semiconductor lasers $10_1, 10_2, \ldots, 10_N$ so that the output of the received signal level detector 22c may become maximum. The semiconductor lasers $10_1, 10_2, \ldots, 10_N$ output the amount of change of the operating state as part of the data signal to the receiver section R.

In the receiver section R, the data regenerator 22b detects the amount of change of the operating state and outputs the detected amount to the controller 23c in the wavelength detector 23. The controller 23c detects the wavelength difference in the channel from the change amount of the operating state of the semiconductor laser. When the change amount has exceeded the allowable value, the controller 23c outputs an abnormality signal to the alarm generator 24.

In this case, the difference between the wavelength of the semiconductor laser and a wavelength minimizing the loss in the optical wavelength demultiplexer can be detected from the change of the operating state of the semiconductor laser.

While in the fourth embodiment, the received signal level is detected by detecting the optical power level after the optical signal has passed through the optical wavelength demultiplexer 21, the received signal level may be detected by intensity-modulating the output beam of a semiconductor laser using an alternating current whose frequency differs from one semiconductor laser to another, and extracting each component.

Additionally, while in the fourth embodiment, the wavelength control signal is sent via the control signal special line, it may be sent via an opposite communication line.

The receiver section in a wavelength division multiplexing optical transmission apparatus according to a fifth embodiment of the present invention will be described with reference to FIG. 5.

In this embodiment, the wavelength division multiplex optical signal transmitted via an optical fiber is amplified by an optical amplifier 31. Part of the optical output of the optical amplifier 31 is branched by a coupler 32 and is inputted to an optical power sensor 33. The rest is inputted to an optical wavelength demultiplexer 21. The optical power sensor 33 senses the output optical power from the optical amplifier 31 and outputs a voltage proportional to the detected optical power to a gain controller 34. The gain controller 34 controls the gain of the optical amplifier 31 so that the output optical power of the optical amplifier 31 may be constant.

The optical wavelength demultiplexer 21 demultiplexes the wavelength division multiplex optical signal for each wavelength and supplies the demultiplexed signals to receivers $22_1, 22_2, \ldots, 22_N$. Each receiver converts the received optical signal into an electric signal and detects the received signal level. A wavelength detector 23 detects the difference between the wavelength of the semiconductor laser and a wavelength minimizing the loss in the optical wavelength demultiplexer 21 from the detected received signal level and when the difference has exceeded an allowable value, an alarm generator 24 outputs an abnormality signal.

With the fifth embodiment, because the input optical power to the optical wavelength demultiplexer 21 is kept constant, fluctuations in the optical power level after demultiplexing correspond to the increase of the loss in the optical wavelength demultiplexer 21 due to the wavelength fluctuation. Therefore, even if the optical power in the transmission path fluctuates, the difference between the wavelength of the semiconductor laser and a wavelength minimizing the loss in the optical wavelength demultiplexer 21 can be detected stably.

Here, the gain is controlled by controlling the output power of the pumping laser of the optical amplifier 31. A variable optical attenuator may be provided at the output of the optical amplifier 21 to control the attenuation.

Figure 6:
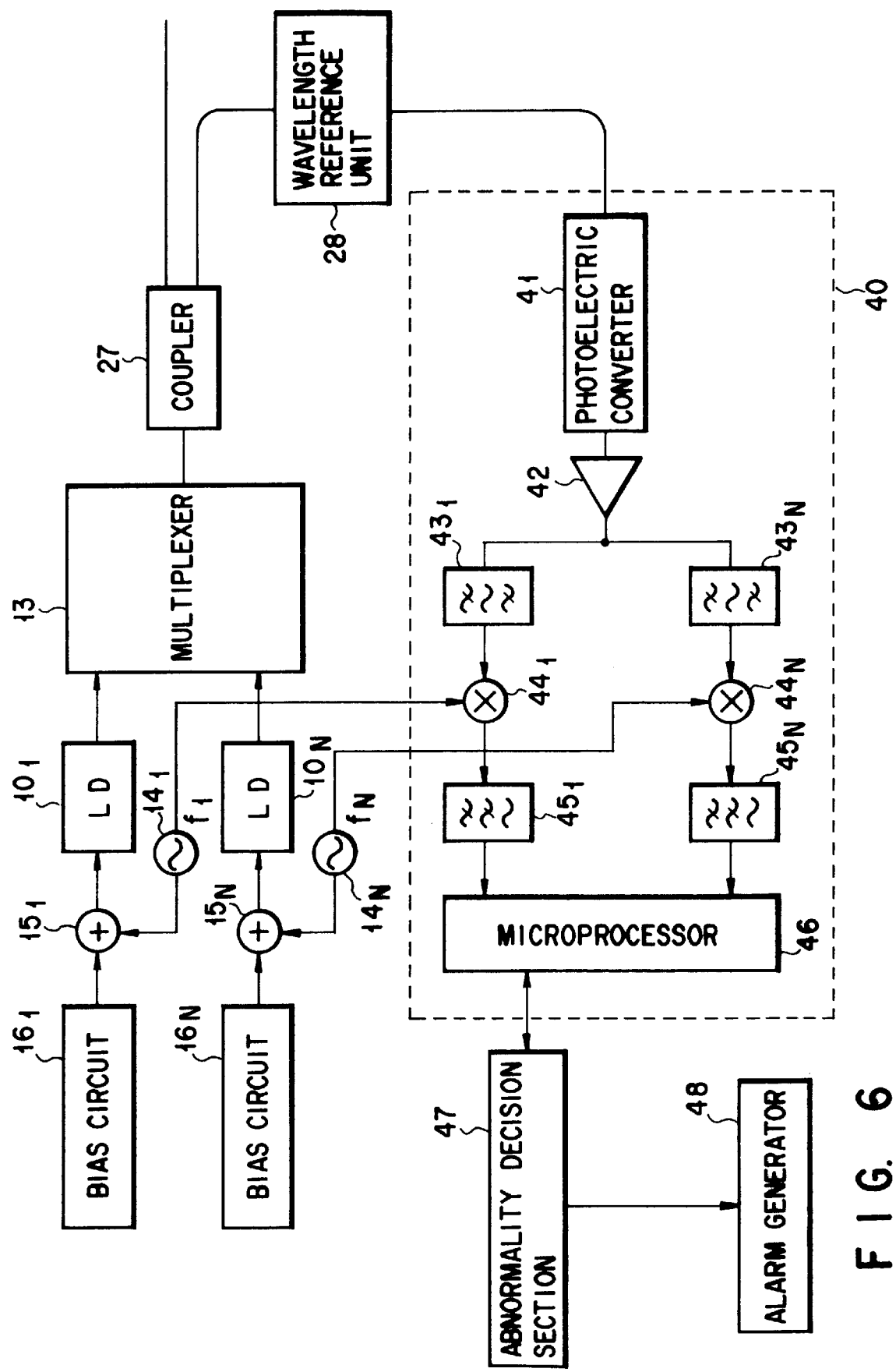
FIG. 6 is a block diagram of the transmitter section in a wavelength division multiplexing optical transmission apparatus according to a sixth embodiment of the present invention.

Referring to FIG. 6, the transmitter section in a wavelength division multiplexing optical apparatus according to a sixth embodiment of the present invention will be explained.

Alternating-current (AC) sources $14_1, \ldots, 14_N$ provided so as to correspond to semiconductor lasers $10_1, \ldots, 10_N$ generate AC signals of different frequencies ($f_1, \ldots, f_N$). Adders $15_1, \ldots, 15_N$ superpose these AC signals on the outputs of bias circuits $16_1, \ldots, 16_N$ and inject them into the semiconductor lasers $10_1, \ldots, 10_N$. This subjects the output beams of the semiconductor lasers $10_1, \ldots, 10_N$ to intensity modulation according to the AC signals generated at AC signal sources $14_1, \ldots, 14_N$. After the output beams from the semiconductor lasers $10_1, \ldots, 10_N$ have been multiplexed at an optical wavelength multiplexer 13, part of the multiplexed light is branched at a coupler 27. The branched light passes through a wavelength reference unit 28 and is supplied to a wavelength monitoring section 40. The wavelength reference unit 28 may be an optical resonator.

In the wavelength monitoring section 40, the output of the photoelectric converter 41 is amplified by an amplifier 42 and is further branched into N signals, which are then supplied to band-pass filters $43_1, \ldots, 43_N$ having the central frequencies equal to the frequencies of the AC signals generated by the AC signal sources $14_1, \ldots, 14_N$, respectively. The outputs of these band-pass filters $43_1, \ldots, 43_N$ undergo synchronous detection at synchronous detectors $44_1, \ldots, 44_N$.

After low-pass filter sections $45_1, \ldots, 45_N$ have removed the unnecessary high-frequency components from the outputs of the synchronous detectors $44_1, \ldots, 44_N$, the resulting signals are inputted to a microprocessor 46. The microprocessor 46 detects the difference between the wavelength of each of the semiconductor lasers $10_1, \ldots, 10_N$ and a reference wavelength of the wavelength reference unit 28 on the basis of the synchronous detection output values supplied via the low pass filters, and outputs a voltage proportional to the wavelength difference to an abnormality decision section 47. The abnormality decision section 47 outputs an abnormality signal to an alarm generator 48 when the wavelength difference has exceeded an allowable value. When receiving an abnormality signal, the alarm generator 48 gives the alarm to notify the operator.

With the sixth embodiment, because the fluctuation of the wavelength of the semiconductor laser is detected and the alarm is raised when the wavelength difference has exceeded the allowable value, it is possible to prevent the receiver sensitivity from deteriorating due to the wavelength fluctuation.

While in the sixth embodiment, the wavelength reference unit is used, the transmission wavelength characteristic of the optical wavelength multiplexer may be used as a wavelength reference unit.

The transmitter section in a wavelength division multiplexing optical transmission apparatus according to a seventh embodiment of the present invention will be described with reference to FIG. 7. For this embodiment, the same parts as those in the embodiment of FIG. 6 are indicated by the same reference symbols and explanation of them will be omitted.

The output beams of semiconductor lasers $10_1, \ldots, 10_N$ are multiplexed by an optical wavelength multiplexer 13. Part of the output of the optical wavelength multiplexer 13 is inputted to a wavelength monitoring section 40 via a coupler 27. The wavelength monitoring section 40 detects the difference between the wavelength of each of the semiconductor lasers $10_1, \ldots, 10_N$ and a wavelength minimizing the loss in the optical wavelength multiplexer 13 and supplies a voltage proportional to the wavelength fluctuation to an abnormality decision section 47.

Operating state monitoring sections $17_1, \ldots, 17_N$ monitor the operating states of each semiconductor laser, including the operating temperature, injection current, and output power, and outputs the information to the abnormality decision section 47. When the wavelength difference has exceeded an allowable value, the abnormality decision section 47 determines the wavelength of the semiconductor laser or the abnormality of the wavelength characteristic of the optical wavelength multiplexer on the basis of the monitoring information from the operating state monitoring section and the wavelength difference from the wavelength monitoring section, and outputs an abnormality signal.

With the seventh embodiment, because the information on the operating state of each semiconductor laser is used in deciding an abnormality, it is possible to predict whether the wavelength of a semiconductor laser is abnormal or the wavelength characteristic of the optical wavelength multiplexer used as a wavelength reference is abnormal.

Figure 8:
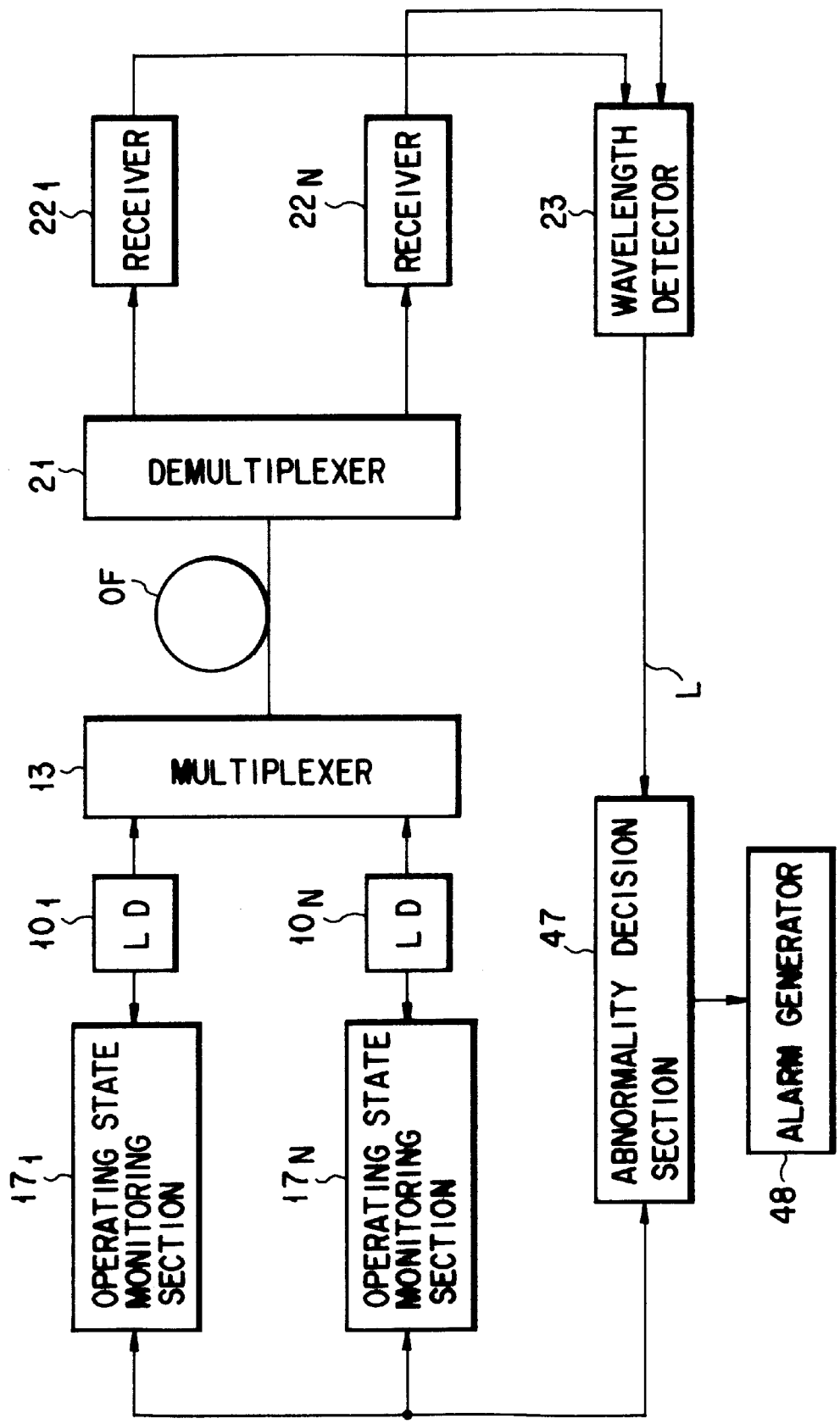
FIG. 8 is a block diagram of a wavelength division multiplexing optical transmission apparatus according to an eighth embodiment of the present invention.

Referring to FIG. 8, a wavelength division multiplexing optical apparatus according to an eighth embodiment of the present invention will be explained.

In this embodiment, semiconductor lasers $10_1, \ldots, 10_N$ are provided with operating state monitoring sections $17_1, \ldots, 17_N$ which monitor their operating temperature, operating current, and output power, respectively. Each operating state monitoring section outputs the monitoring signals in proportion to the operating temperature, operating current, and output power of the semiconductor laser to the abnormality decision section 47.

The output beams of the semiconductor lasers $10_1, \ldots, 10_N$ are multiplexed by an optical wavelength multiplexer 13 and the resulting wavelength division multiplex optical signal is transmitted via an optical fiber OF. The wavelength division multiplex optical signal is demultiplexed for each wavelength by an optical wavelength demultiplexer 21 and the respective demultiplexed signals are received by optical receivers $22_1, \ldots, 22_N$. A wavelength detector 23 detects the difference between the wavelength of the semiconductor laser and a wavelength minimizing the loss in the optical wavelength demultiplexer and when the wavelength difference has exceeded an allowable value, transmits an abnormality signal to an abnormality decision section 47 via a control line L.

On the basis of the abnormality signal from the wavelength detector 23 and the monitoring information from the operating state monitoring sections $17_1, \ldots, 17_N$, the abnormality decision section 47 determines whether the wavelength of the transmitter is abnormal or the optical wavelength demultiplexer is abnormal. Because the eighth embodiment not only detects the wavelength difference, but also determines which of the transmitter section T and the receiver section R is abnormal, it is possible to determine the abnormal place. While in this embodiment, the control line L is used to transmit an abnormality signal from the wavelength detector to the abnormality decision section 47, an opposite communication line may be used.

Figure 9:
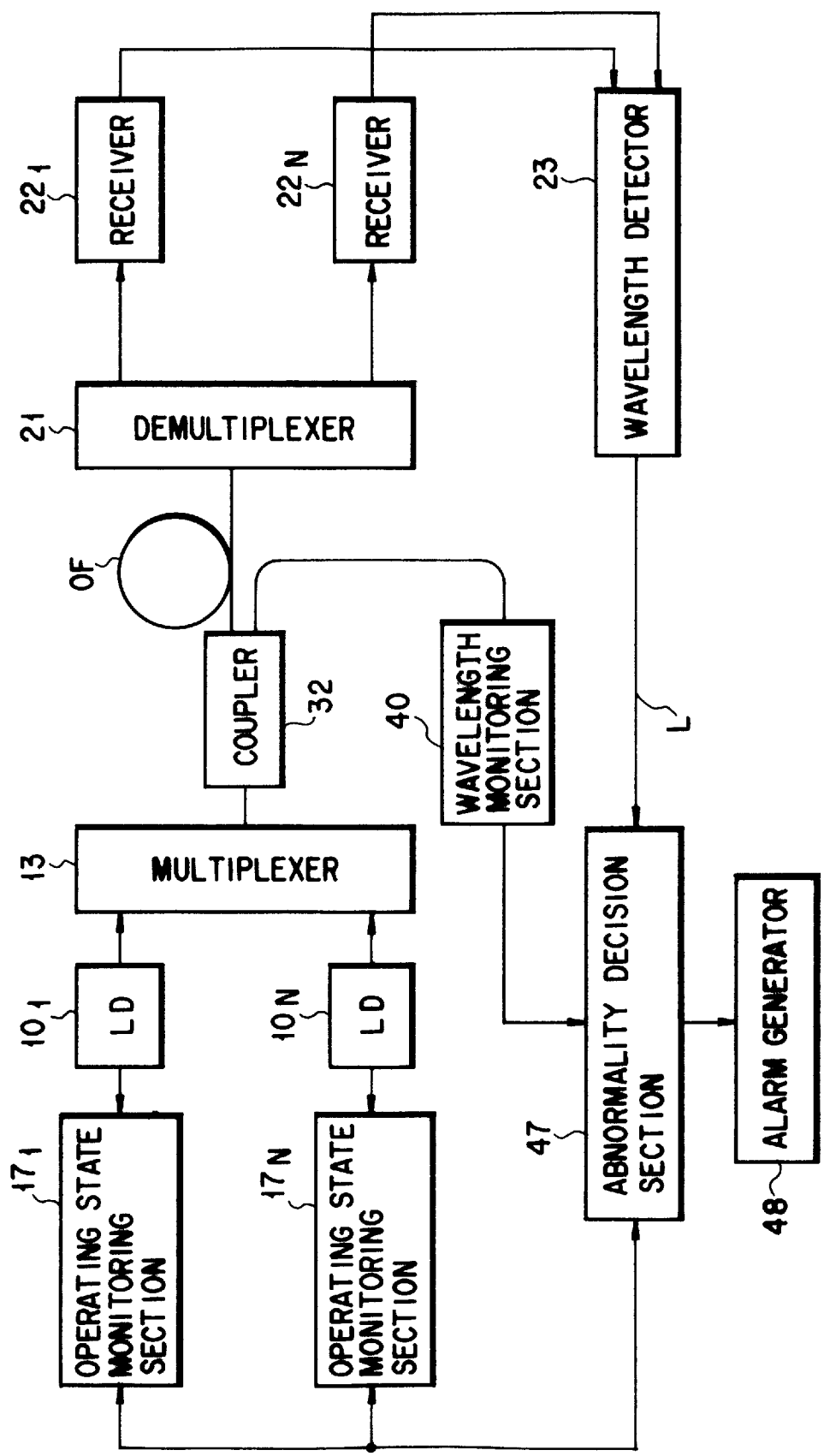
FIG. 9 is a block diagram of a wavelength division multiplexing optical transmission apparatus according to a ninth embodiment of the present invention.

Referring to FIG. 9, a wavelength division multiplexing optical apparatus according to a ninth embodiment of the present invention will be explained. For this embodiment, the same parts as those in FIG. 8 are indicated by the same reference symbols and explanation of them will be omitted.

The output beams from semiconductor lasers $10_1, \ldots, 10_N$ are multiplexed by an optical wavelength multiplexer 13. Part of the output of the optical wavelength multiplexer 13 is branched by a coupler 32 and is inputted to a wavelength monitoring section 40. Using the wavelength characteristic of the optical wavelength multiplexer 13 as a wavelength reference, the wavelength monitoring section 40 monitors the difference between the wavelength of the transmitter and a wavelength minimizing the loss in the optical wavelength multiplexer 13 and supplies an output signal in proportion to the wavelength difference to an abnormality decision section 47. Receiving the abnormality signal from the wavelength detector 23, the abnormality decision section 47 determines whether the transmitter section is abnormal or the receiver section is abnormal, on the basis of the abnormality signal, the monitoring signals from the operating state monitoring sections $17_1, \ldots, 17_N$, and the monitoring signal from the wavelength monitoring section 41.

With the ninth embodiment, because the monitoring information on the wavelength of the transmitter is used as a decision reference, the determining of an abnormal place can be effected more accurately.

Figure 10:
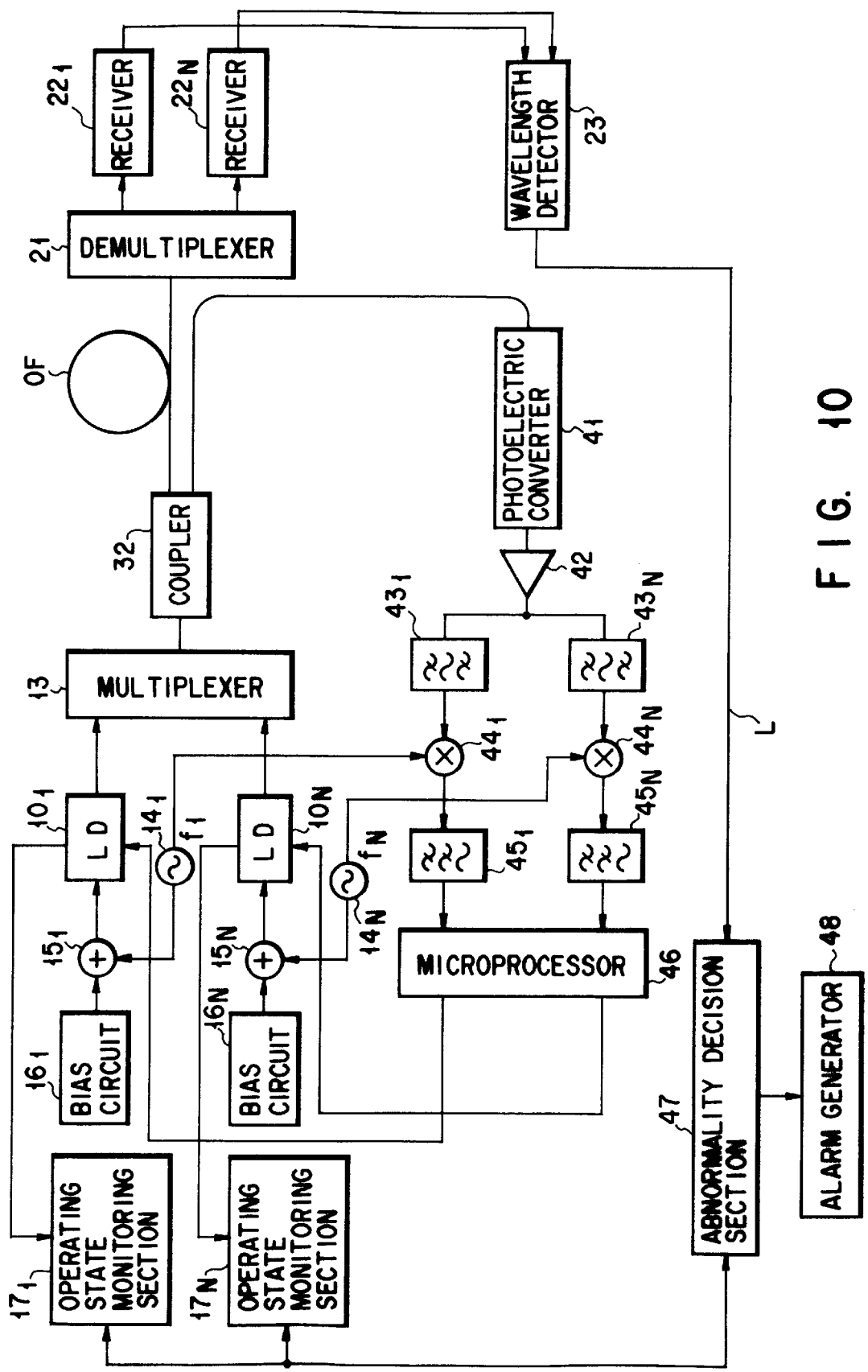
FIG. 10 is a block diagram of a wavelength division multiplexing optical transmission apparatus according to a tenth embodiment of the present invention.

Referring to FIG. 10, a wavelength division multiplexing optical apparatus according to a tenth embodiment of the present invention will be explained. For this embodiment, the same parts as those in FIGS. 8 and 9 are indicated by the same reference symbols and explanation of them will be omitted.

Alternating-current (AC) sources $14_1, \ldots, 14_N$ provided so as to correspond to semiconductor lasers $10_1, \ldots, 10_N$ generate AC signals of different frequencies ($f_1, f_2, \ldots, f_N$). Adders $15_1, \ldots, 15_N$ superpose these AC signals on the outputs of bias circuits $16_1, \ldots, 16_N$ and inject them into the semiconductor lasers $10_1, \ldots, 10_N$. This subjects the output beams of the semiconductor lasers $10_1, \ldots, 10_N$ to intensity modulation according to the AC signals generated at AC signal sources $14_1, \ldots, 14_N$.

After the output beams from the semiconductor lasers $10_1, \ldots, 10_N$ have been multiplexed at an optical wavelength multiplexer 13, part of the resulting beam is branched at a coupler 32 and inputted to a photoelectric converter 41. The output of the photoelectric converter 41 is amplified by an amplifier 42 and is further branched into N signals, which are then supplied to band-pass filters $43_1, \ldots, 43_N$ having the central frequencies equal to the frequencies of the AC signals generated by the AC signal sources $14_1, \ldots, 14_N$. The outputs of these band-pass filters $43_1, \ldots, 43_N$ undergo synchronous detection at synchronous detectors $44_1, \ldots, 44_N$. After low-pass filter sections $45_1, \ldots, 45_N$ have removed the unnecessary high-frequency components from the outputs of the synchronous detectors, the resulting signals are inputted to a microprocessor 46. On the basis of the synchronous detection output values supplied via the low pass filters, the microprocessor section controls the temperatures of the semiconductor lasers $10_1, \ldots, 10_N$ so that the wavelength of each of the semiconductor lasers $10_1, \ldots, 10_N$ may be locked to a wavelength minimizing the loss in the optical wavelength multiplexer 13. With this control, it is possible to stabilize the wavelength of the semiconductor laser.

On the other hand, the wavelength division multiplex optical signal transmitted via an optical fiber OF is demultiplexed for each wavelength by an optical wavelength demultiplexer 21 and the respective demultiplexed signals are received by optical receivers $22_1, \ldots, 22_N$. A wavelength detector 23 detects the difference between the wavelength of the semiconductor laser and a wavelength minimizing the loss in the optical wavelength demultiplexer on the basis of the received signal level at each optical receiver and when the wavelength difference has exceeded an allowable value, transmits an abnormality signal to an abnormality decision section 47 via a control line L. On the basis of the abnormality signal from the wavelength detector 23 and the monitoring information from the operating state monitoring sections $17_1, \ldots, 17_N$, the abnormality decision section 47 determines whether the multiplexer is abnormal or the optical wavelength demultiplexer is abnormal.

Further, the abnormality of each of the semiconductor lasers is determined on the basis of the monitoring information from the operating state monitoring section $17_1, \ldots, 17_N$.

With the tenth embodiment, since each wavelength of the semiconductor laser is stabilized to a wavelength minimizing the loss in the optical wavelength multiplexer, the wavelength detector has only to detect the wavelength difference between the wavelength characteristic of the optical wavelength multiplexer and that of the optical wavelength demultiplexer. Therefore, it is possible to simplify the wavelength monitoring function.

Figure 11:
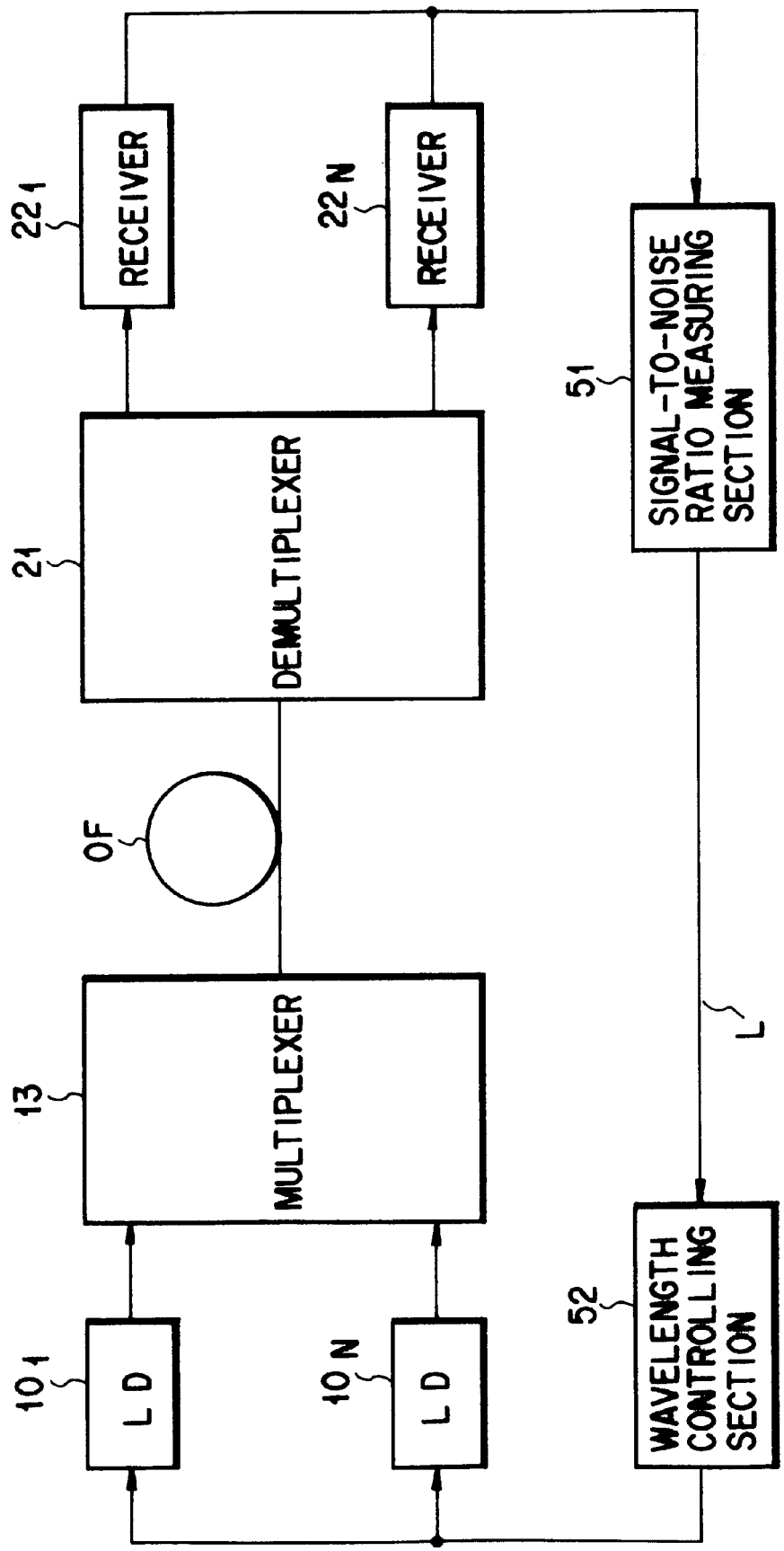
FIG. 11 is a block diagram of a wavelength division multiplexing optical transmission apparatus according to an eleventh embodiment of the present invention.

Referring to FIG. 11, a wavelength division multiplexing optical apparatus according to an eleventh embodiment of the present invention will be explained.

The output beams of semiconductor lasers $10_1, \ldots, 10_N$ are multiplexed at an optical wavelength multiplexer 13 into a wavelength division multiplex optical signal. The wavelength division multiplex optical signal transmitted via an optical fiber OF is demultiplexed for each wavelength at an optical wavelength demultiplexer 21 and the demultiplexed signals are received by optical receivers $22_1, \ldots, 22_N$, respectively. Part of each optical receiver is supplied to a signal-to-noise ratio measuring section 51. The signal-to-noise ratio measuring section 51 measures the signal-to-noise ratio of the received signal and transmits a feedback control signal to the transmitter section via a control line L so that the ratio may be maximum. A wavelength control section 52 controls the wavelength of each semiconductor laser according to the control signal.

With the eleventh embodiment, since the wavelength of the transmitter is controlled so that the signal-to-noise ratio in each optical receiver may be maximum, the signal can be transmitted in a state where the crosstalk from another channel is minimum. While in the eleventh embodiment, the feedback control signal is transmitted via the control line, it may be transmitted via an opposite communication line.

FIG. 12 shows a concrete example of the signal-to-noise ratio measuring system. In the figure, the optical signal of each wavelength ($\lambda i$: i=1, 2, ..., N) demultiplexed at the optical wavelength demultiplexer is converted by a photoelectric converter $61i$ (i=1, ..., N) into an electric signal, which is then amplified by an amplifier $62i$ and thereafter is branched into three sub-signals. The three branched signals are inputted to a first discrimination circuit $63i$, a second discrimination circuit $64i$, and a clock extraction circuit $65i$, respectively. The clock extraction circuit extracts the clock component of the data signal and supplies the clock signal to the first and second discrimination circuits $63i$ and $64i$. The first discrimination circuit $63i$ has its discrimination level optimized and regenerates the transmitted data. On the other hand, the second discrimination circuit $64i$ varies the discrimination level on the basis of the control signal from a microprocessor $67i$ and regenerates the data on the basis of the discrimination level. An exclusive OR circuit $66i$ XORs the data items regenerated at the first and second discrimination circuits $63i$ and $64i$. The microprocessor $67i$ computes a Q value on the basis of the output of the exclusive OR circuit $66i$ and outputs a voltage corresponding to the computed Q value to a signal-to-noise ratio measuring section 51. The signal-to-noise ratio measuring section 51 calculates the signal-to-noise ratio of the data signal on the basis of equation (1) using the computed Q value:

$$Q = 20 \log(S/N) \qquad (1)$$

With the above configuration, the signal-to-noise ration of the data signal can be measured.

Figure 13:
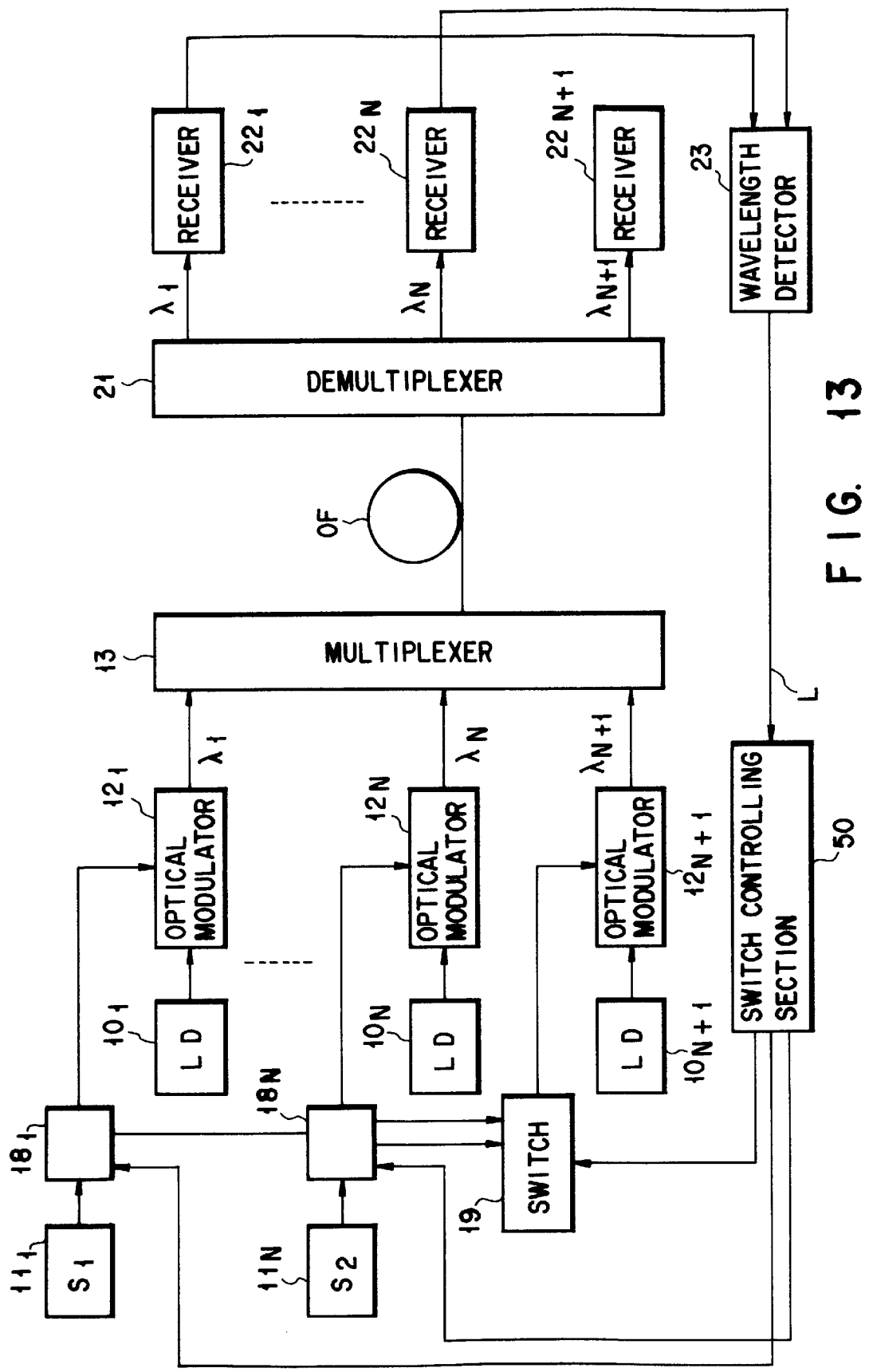
FIG. 13 is a block diagram of a wavelength division multiplexing optical transmission apparatus according to a thirteenth embodiment of the present invention.

Referring to FIG. 13, a wavelength division multiplexing optical transmission apparatus according to a thirteenth embodiment of the present invention will be explained.

In this embodiment, data signals $S_1, S_2, \ldots, S_N$ are inputted to optical modulators $12_1, 12_2, \ldots, 12_N$ via switch circuits $18_1$, $18_2$, ..., $18_N$. Semiconductor lasers $10_1$, $10_2$, ..., $10_N$ have different wavelengths $\lambda_1$, $\lambda_2$, ..., $\lambda_N$. The outputs of these lasers are subjected to intensity modulation at the optical modulators $12_1$, $12_2$, ..., $12_N$ and the modulated outputs are multiplexed at an optical wavelength multiplexer 13. A spare semiconductor laser $10_{N+1}$ has a different wavelength $\lambda_{N+1}$ from those of the semiconductor lasers. Its output is multiplexed at the optical wavelength multiplexer 13 as are the outputs of the semiconductor lasers. The output of the optical wavelength multiplexer 13 is transmitted via an optical fiber OF and is demultiplexed at an optical wavelength demultiplexer 21 for each wavelength. The branched signals are received by optical receivers $22_1$, $22_2$, ..., $22_N$, $22_{N+1}$ respectively.

On the basis of the respective received signal levels of the optical receivers $22_1$, $22_2$, ..., $22_N$, $22_{N+1}$, a wavelength detector 23 detects the difference between the wavelength of the semiconductor laser and a wavelength minimizing the loss in the optical wavelength demultiplexer and when the wavelength difference has exceeded an allowable value, transmits an abnormality signal to a switch control section 50 via a control line L.

Receiving the abnormality signal, the switch control section 50 outputs control signals to switches $18_1$, $18_2$, ..., $18_N$ and a switch 19 so as to switch the data signal in the channel determined to be abnormal to the spare wavelength $\lambda_{N+1}$.

With the thirteenth embodiment, even if a wavelength abnormality has occurred during service, the system can be restored without interrupting service, by switching the wavelength of the data signal in the channel where an abnormality has taken place to the spare wavelength. While in the thirteenth embodiment, the abnormality signal is transmitted via the control line, it may be transmitted via an opposite communication line.

FIG. 14 shows the configuration of a wavelength division multiplexing optical transmission apparatus according to a fourteenth embodiment of the present invention. In the figure, alternating-current (AC) signal sources $112_1$, $112_2$, ..., $112_N$ provided so as to correspond to semiconductor lasers (LD) $111_1$, $111_2$, ..., $111_N$ generate AC signals of different frequencies ($f_1$, $f_2$, ..., $f_N$). The frequencies $f_1$, $f_2$, ..., $f_N$ are set in the low frequency regions outside the frequency band of data signals $S_1$, $S_2$, ..., $S_N$. Adders $113_1$, $113_2$, ..., $113_N$ superpose these AC signals on the outputs of bias circuits $114_1$, $114_2$, ..., $114_N$ and inject the superposed signals to the semiconductor lasers $111_1$, $111_2$, ..., $111_N$, whereby the outputs of the semiconductor lasers $111_1$, $111_2$, ..., $111_N$ are modulated according to the AC signals generated at the AC signal sources $112_1$, $112_2$, ..., $112_N$.

After the output beams of the semiconductor lasers $111_1$, $111_2$, ..., $111_N$ have been modulated by external modulators $130_1$, $130_2$, ..., $130_N$, respectively, using data signals $S_1$, $S_2$, ..., $S_N$, the modulated signals are wavelength-multiplexed at an optical wavelength multiplexer 110. The wavelength division multiplex optical signal is branched by an optical coupler 125 into two; one is amplified by an optical fiber amplifier 140 and sent to a transmission optical fiber 100, and the other is supplied to a photoelectric converter 125.

The output of the photoelectric converter 125 is amplified by an amplifier 109. The amplified signal is further branched into N sub-signals, which are then supplied to band-pass filters (BPF) $116_1$, $116_2$, ..., $116_N$ having the central frequencies equal to the frequencies of the AC signals generated by the AC signal sources $112_1$, $112_2$, ..., $112_N$, respectively. Specifically, the band-pass filters $116_1$, $116_2$, ..., $116_N$ extract the components of the same frequencies $f_1$, $f_2$, ..., $f_N$ as those of the AC signals generated by the AC signal sources $112_1$, $112_2$, ..., $112_N$ from the output of the photoelectric converter 125. Synchronous detectors $115_1$, $115_2$, ..., $115_N$ multiply the outputs of these band-pass filters $116_1$, $116_2$, ..., $116_N$ by the AC signals from the AC signal sources $112_1$, $112_2$, ..., $112_N$ and perform synchronous detection. After low-pass filters (LPF) $117_1$, $117_2$, ..., $117_N$ have removed the unnecessary high-frequency components from the outputs of the synchronous detectors $115_1$, $115_2$, ..., $115_N$, the resulting signals are inputted to a microprocessor 120. The microprocessor 120 controls the temperature of each of the semiconductor lasers $111_1$, $111_2$, ..., $111_N$ on the basis of the synchronous detection output values inputted via the low-pass filters $117_1$, $117_2$, ..., $117_N$ so that the wavelength of each of the semiconductor lasers $111_1$, $111_2$, ..., $111_N$ may be locked to a wavelength minimizing the loss in the optical wavelength multiplexer 110. This control realizes the stabilization of the wavelengths of the semiconductor lasers $111_1$, $111_2$, ..., $111_N$.

Figure 15:
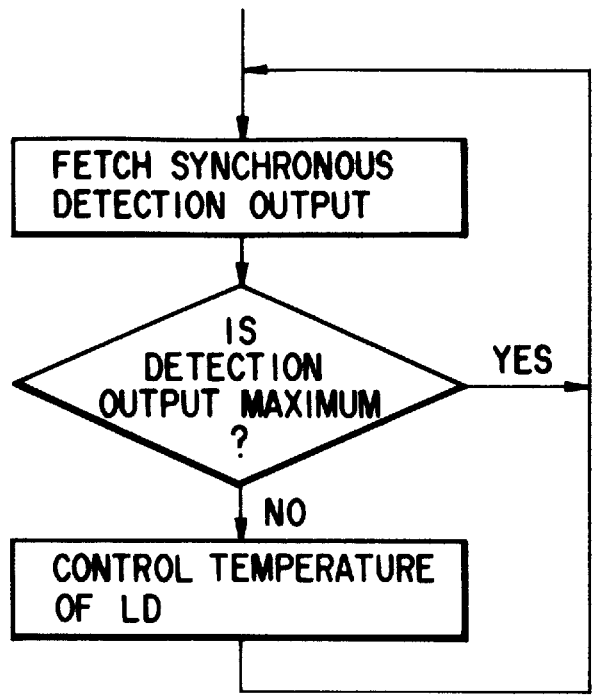
FIG. 15 is a flowchart for LD temperature control in the transmitter section of the fourteenth embodiment.

Specifically, as shown in the flowchart of FIG. 15, the microprocessor 120 fetches the output value of the synchronous detection in a memory, and decides whether or not it is maximum on the basis of comparing with a last value. If the fetched value is not maximum, the temperature of the semiconductor laser is controlled to make the output value maximum. If it is maximum, the temperature of semiconductor laser is kept.

Figure 16:
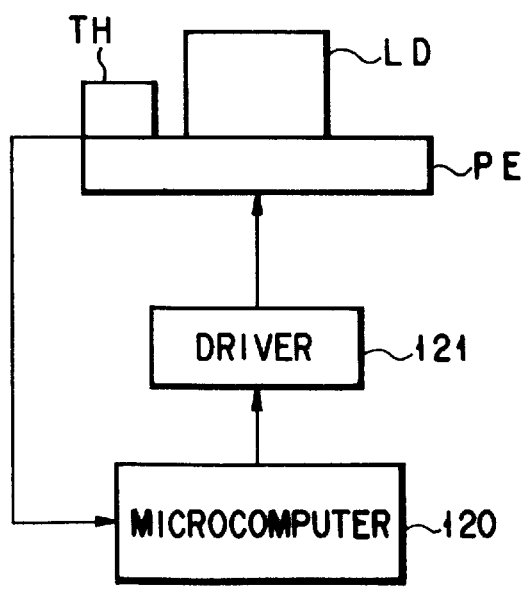
FIG. 16 is a block diagram of the LD temperature control system in the transmitter section of FIG. 15.

FIG. 16 shows the temperature control system in the semiconductor laser LD. In the figure, the semiconductor laser LD is provided with a Peltier element PE. The Peltier element PE is driven by a driver 21 controlled by a microprocessor 120 to perform temperature control. The temperature of the semiconductor laser LD is measured by a thermistor TH mounted near the semiconductor laser LD. The measured temperature is sent to the microprocessor 120, whereby the temperature of the semiconductor laser is monitored.

Figure 17:
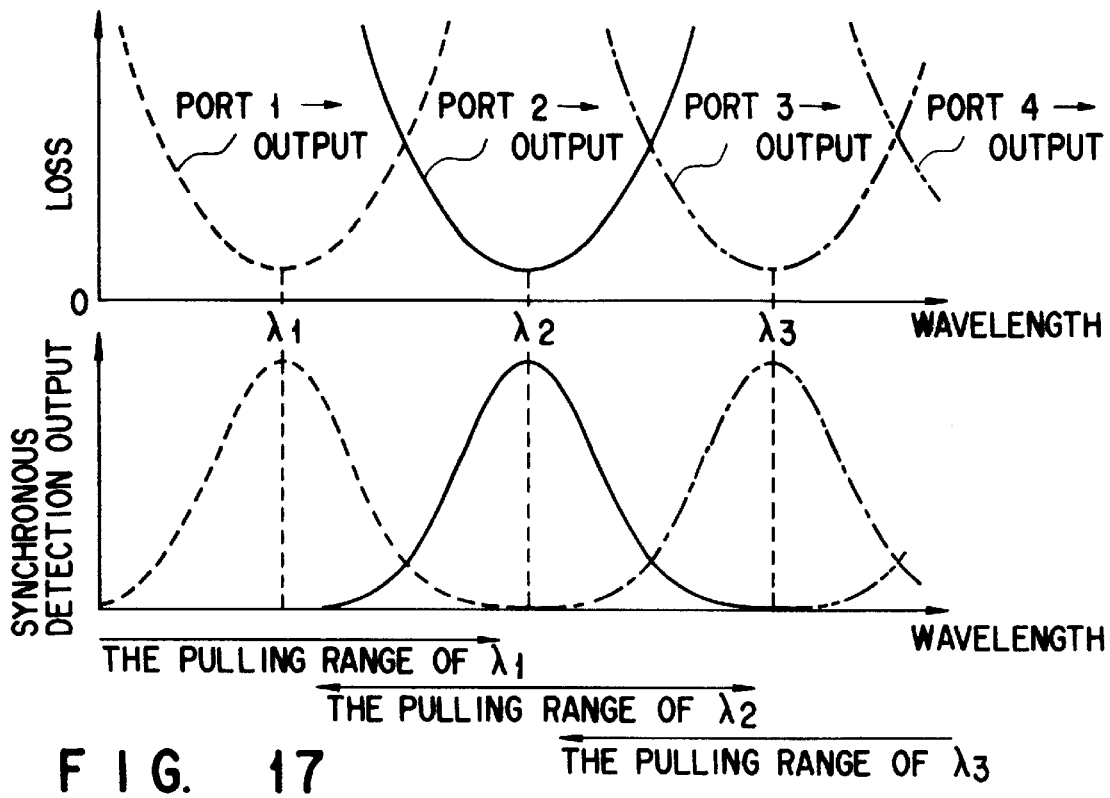
FIG. 17 shows a transmission characteristic of the optical wavelength multiplexer and its synchronous detection output in the fourteenth embodiment.

FIG. 17 shows the transmission loss characteristic of the optical wavelength multiplexer 110 and its synchronous detection output. It is apparent from the figure that when the temperature of each of the semiconductor lasers $111_1$, $111_2$, ..., $111_N$ is controlled by the microprocessor 120 so that the synchronous detection output may be maximum, the wavelengths $\lambda_1$, $\lambda_2$, ..., $\lambda_N$ of the semiconductor lasers $111_1$, $111_2$, ..., $111_N$ are stabilized to a wavelength minimizing the loss in the optical wavelength multiplexer 110.

In FIG. 17, the transmission loss characteristic for wavelengths viewed from the input port of the optical wavelength multiplexer 110 to the output port shows that there is only one wavelength that presents the minimum loss. Therefore, even when the wavelengths $\lambda_1$, $\lambda_2$, ..., $\lambda_N$ of the semiconductor lasers $111_1$, $111_2$, ..., $111_N$ vary as far as the regions of the wavelengths of the adjacent semiconductor lasers, they can be pulled in the desired wavelengths by controlling the temperatures of the semiconductor lasers $111_1$, $111_2$, ..., $111_N$ so that the synchronous detection output may be maximum. Namely, the wavelength capture ranges of the semiconductor lasers $111_1$, $111_2$, ..., $111_N$ do not depend on the channel spacing and are ensured over a wide frequency range.

As described above, with the wavelength stabilizing unit, the wavelength capture range does not depend on the channel spacing and is ensured over a wide frequency range, it is possible to perform wavelength stabilizing control of the semiconductor lasers $111_1$, $111_2$, ..., $111_N$ more reliably.

Furthermore, with the present invention, since modulation of the semiconductor lasers $111_1$, $111_2$, ..., $111_N$ to stabilize the wavelength is intensity modulation, which is different from frequency modulation used in a conventional wavelength division multiplexing optical transmission apparatus, stable control can be effected, regardless of the modulation frequency.

While in the fourteenth embodiment, the temperature is controlled for wavelength control of the semiconductor lasers $111_1$, $111_2$, ..., $111_N$, wavelength control may be effected by controlling the injection currents to the semiconductor lasers $111_1$, $111_2$, ..., $111_N$.

Additionally, when a multi-electrode laser is used as a light source, wavelength control and output power control may be performed simultaneously by controlling the injection currents to the semiconductor lasers.

Figure 18:
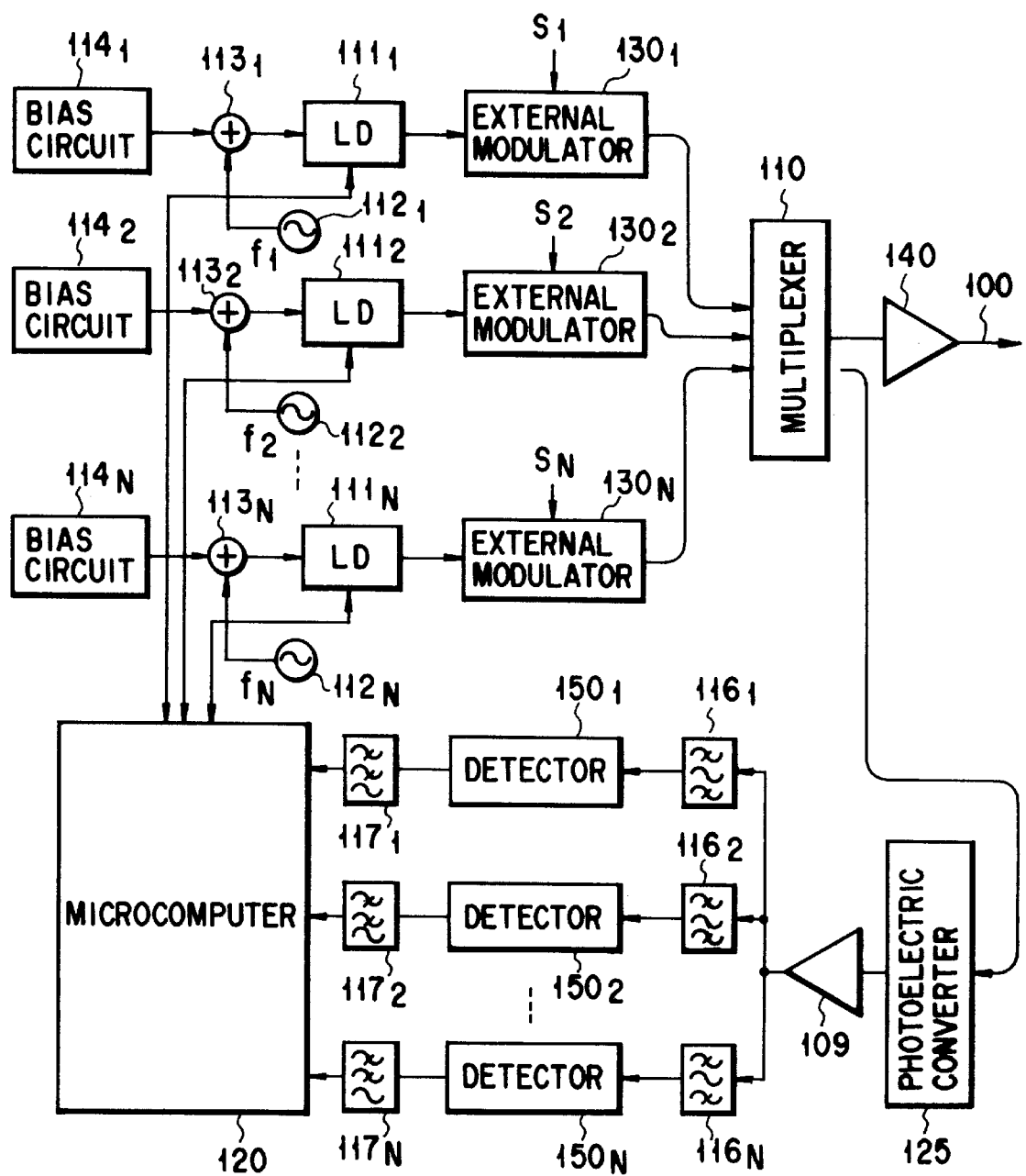
FIG. 18 is a block diagram of the transmitter section in a wavelength division multiplexing optical transmission apparatus according to a fifteenth embodiment of the present invention.

FIG. 18 shows the configuration of the transmitter section in a wavelength division multiplexing optical transmission apparatus according to a fifteenth embodiment of the present invention. In this embodiment, the same parts as those in the embodiment of FIG. 14 are indicated by the same reference symbols and their explanation will be omitted.

In the fifteenth embodiment, the output of an amplifier 109 is branched into N sub-signals, which are supplied to band-pass filters $116_1$, $116_2$, ..., $116_N$ having the central frequencies equal to the frequencies $f_1$, $f_2$, ..., $f_N$ of the AC signals generated by the AC signal sources $112_1$, $112_2$, ..., $112_N$, respectively. Specifically, the band-pass filters $116_1$, $116_2$, ..., $116_N$ extract the components of the same frequencies as those of the AC signals generated by the AC signal sources $112_1$, $112_2$, ..., $112_N$, namely the modulated components in intensity modulation of the semiconductor lasers $111_1$, $111_2$, ..., $111_N$ from the output of the photoelectric converter 125. Detectors $150_1$, $150_2$, pass filters $116_1$, $116_2$, ..., $116_N$. In this case, the detected outputs of the detectors $150_1$, $150_2$, ..., $150_N$ have the same characteristic as that of the synchronous detection output shown in FIG. 17. Therefore, on the basis of the outputs of the detectors $150_1$, $150_2$, ..., $150_N$ inputted via low-pass filters $117_1$, $117_2$, ..., $117_N$, a microprocessor 120 controls the temperatures of the semiconductor lasers $111_1$, $111_2$, ..., $111_N$ according to the flowchart of FIG. 15 so that the wavelength of each of the semiconductor lasers $111_1$, $111_2$, ..., $111_N$ may be locked to a wavelength minimizing the loss in the optical wavelength multiplexer 110. This makes it possible to realize the stabilization of the wavelengths of the semiconductor lasers $111_1$, $111_2$, ..., $111_N$, as in the fourteenth embodiment.

FIG. 19 shows the configuration of a wavelength division multiplexing optical transmission apparatus according to a sixteenth embodiment of the present invention. In this embodiment, the same parts as those in the embodiment of FIG. 14 are indicated by the same reference symbols and explanation of them will not be given.

With the sixteenth embodiment, when a microprocessor 120 has determined that the wavelengths of more than a specified number of those of all the semiconductor lasers $111_1$, $111_2$, ..., $111_N$, for example, more than half of them, should be shifted simultaneously in the same direction (in the direction toward either the long wavelength side of the short wavelength side), the microprocessor 120 considers that an abnormality has occurred in the optical wavelength multiplexer 110, that is, the transmission wavelength characteristic has deviated, not that the wavelengths of the semiconductor lasers $111_1$, $111_2$, ..., $111_N$ have deviated, and causes an alarm generator 135 to raise the alarm. Additionally, when the abnormality has occurred in the multiplexer, the microprocessor 120 outputs a control signal so as to adjust the wavelength characteristic of the optical wavelength multiplexer 110. The wavelength characteristic of the optical wavelength multiplexer 110 is adjusted by controlling the temperature.

Figure 20:
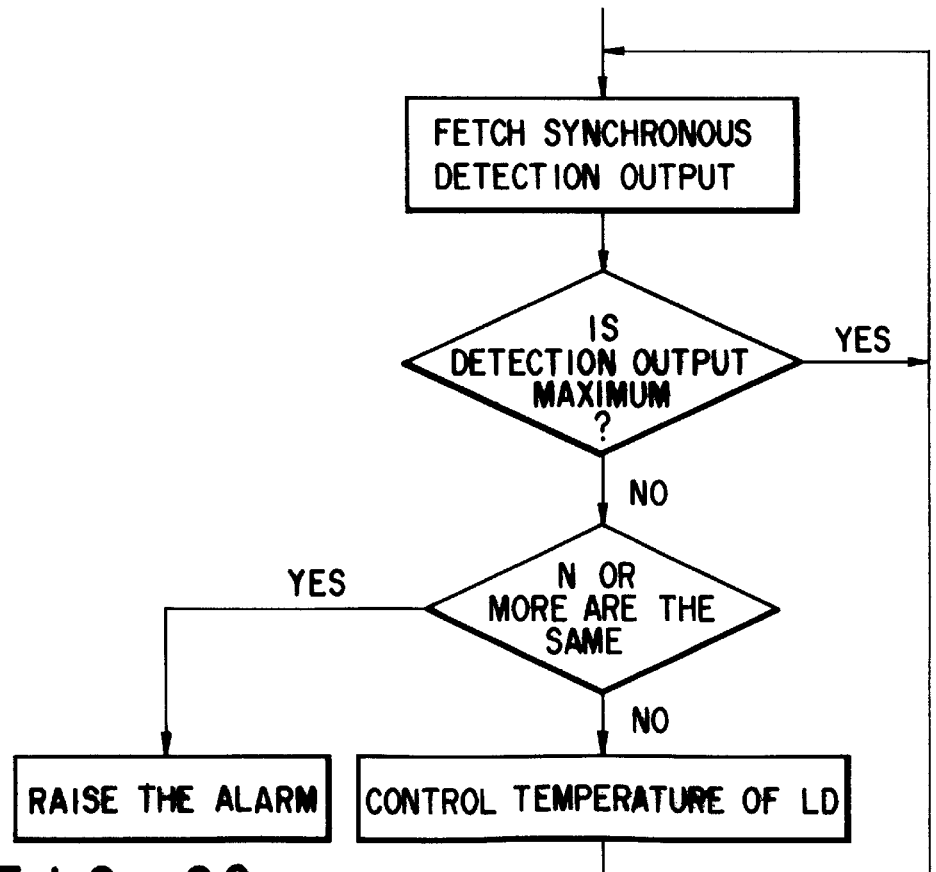
FIG. 20 is a flowchart for LD temperature control in the transmitter section in the sixteenth embodiment.

Specifically, as shown in the flowchart of FIG. 20, the synchronous detection output is fetched and decided whether it is the maximum value or not. If it is maximum value, control returns to the fetch flow for fetching a next synchronous detection output. If the detection output is not the maximum value, it is determined whether or not the number of semiconductor lasers whose wavelength is to be shifted in the same direction has exceeded a specified number (M). If the specified number has been exceeded, the alarm is raised. If the specified number has not been exceeded, temperature control of the semiconductor lasers LD is carried out.

As described above, with the sixteenth embodiment, on the basis of the synchronous detection output value inputted via the low-pass filters $117_1$, $117_2$, ..., $117_N$ to stabilize the wavelengths of the semiconductor lasers $111_1$, $111_2$, ..., $111_N$, the microprocessor 120 controls the semiconductor lasers $111_1$, $111_2$, ..., $111_N$ so that the wavelength of each of the semiconductor lasers $111_1$, $111_2$, ..., $111_N$ is locked to a wavelength minimizing the loss in the optical wavelength multiplexer 110. In wavelength control of the semiconductor lasers $111_1$, $111_2$, ..., $111_N$, when a specified number of them require control in the same direction, the microprocessor controls the wavelength characteristic of the optical wavelength multiplexer 110.

As described above, with the sixteenth embodiment, in addition to the same effect as in the fourteenth embodiment, the wavelength characteristic of the optical wavelength multiplexer 110 can be kept constant, producing the effect of enabling more stable wavelength control.

FIG. 21 shows the configuration of a wavelength division multiplexing optical transmission apparatus according to a seventeenth embodiment of the present invention. In this embodiment, the same parts as those in the embodiment of FIG. 14 are indicated by the same reference symbols and explanation of them will be omitted.

With the seventeenth embodiment, in addition to the configuration of the embodiment of FIG. 14, an ambient temperature sensor 160 is provided. The output signal of the ambient temperature sensor 160 is inputted to a microprocessor 120. The temperature characteristic of the optical wavelength multiplexer 110 is previously known. On the basis of the signal from the ambient temperature sensor 160, the microprocessor 120 controls the wavelength characteristic of the optical wavelength multiplexer 110 so as to compensate the temperature characteristic of the optical wavelength multiplexer 110.

Figure 22:
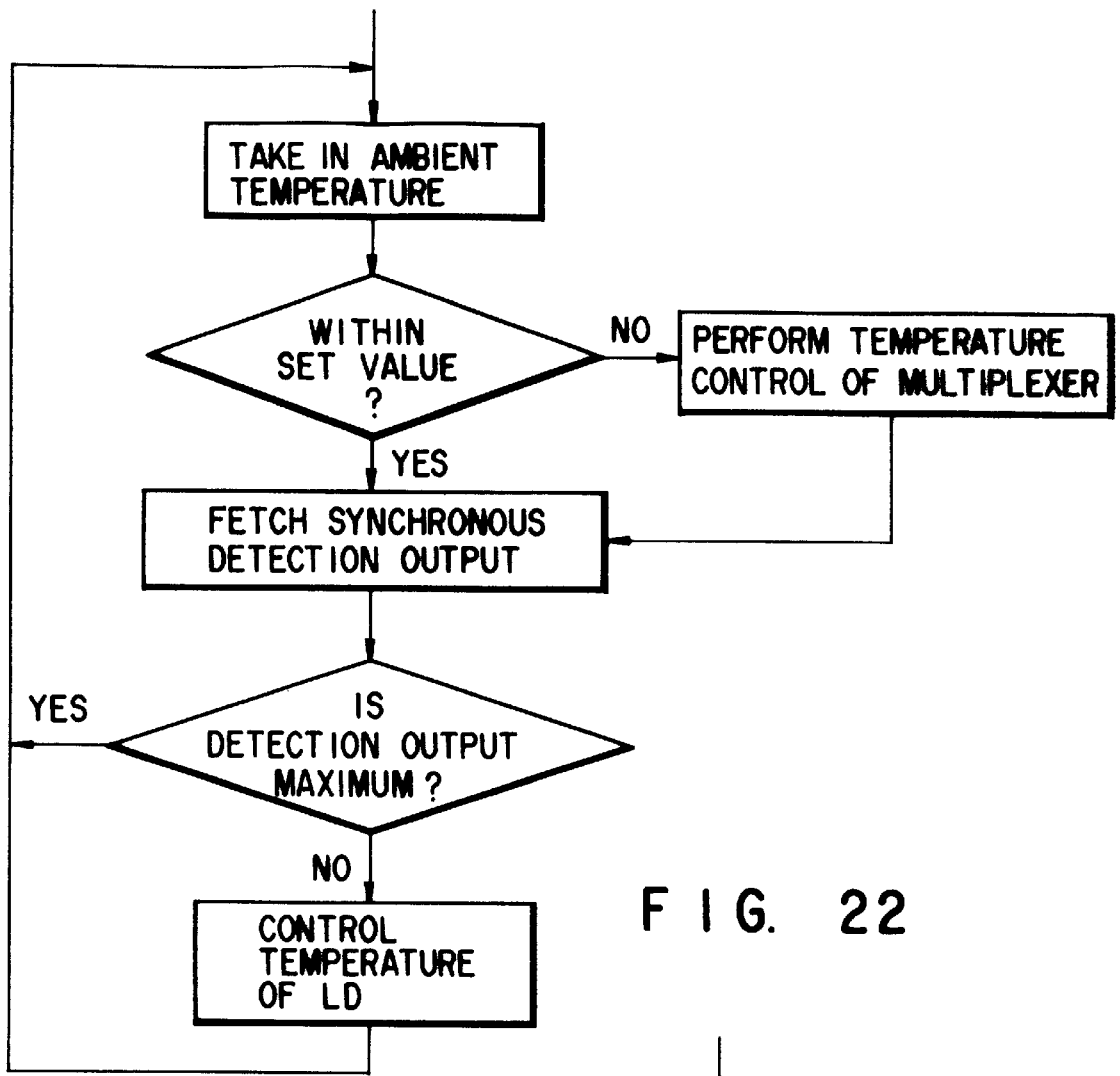
FIG. 22 is a flowchart for LD temperature control in the transmitter section of the seventeenth embodiment.

As shown in the flowchart of FIG. 22, the microprocessor 120 takes in the ambient temperature from the ambient temperature sensor 160 and determines whether the temperature is within the setting values. If it is outside the setting values (NO), the microprocessor 120 controls the semiconductor laser (LD) after it performed temperature compensation control of the optical wavelength multiplexer 110. If it is within the setting values (YES), the microprocessor 120 perform temperature control of the semiconductor lasers (LD). In temperature control of the semiconductor lasers (LD), the microprocessor 120 fetches the synchronous detection output and determines whether or not the fetched synchronous detection output is the maximum value. When the fetched synchronous detection output is not a maximum value, the microprocessor 120 executes temperature control of the semiconductor lasers (LD) via the temperature control system shown in FIG. 16. If the fetched synchronous detection output is the maximum value, the microprocessor 120 fetches another synchronous detection output. In temperature control of the semiconductor lasers, to stabilize the wavelengths of the semiconductor lasers $111_1$, $111_2$, ..., $111_N$, the semiconductor lasers $111_1$, $111_2$, ..., $111_N$ are controlled on the basis of the synchronous detection output values inputted via the low-pass filters $117_1$, $117_2$, ..., $117_N$ so that the wavelength of each of the semiconductor lasers $111_1$, $111_2$, ..., $111_N$ may be locked to a wavelength minimizing the loss in the optical wavelength multiplexer 110.

Accordingly, with the seventeenth embodiment, too, in addition to the same effect as in the fourteenth embodiment, it is possible to produce the effect of enabling stable wavelength control even under fluctuations in ambient temperature.

Figure 23:
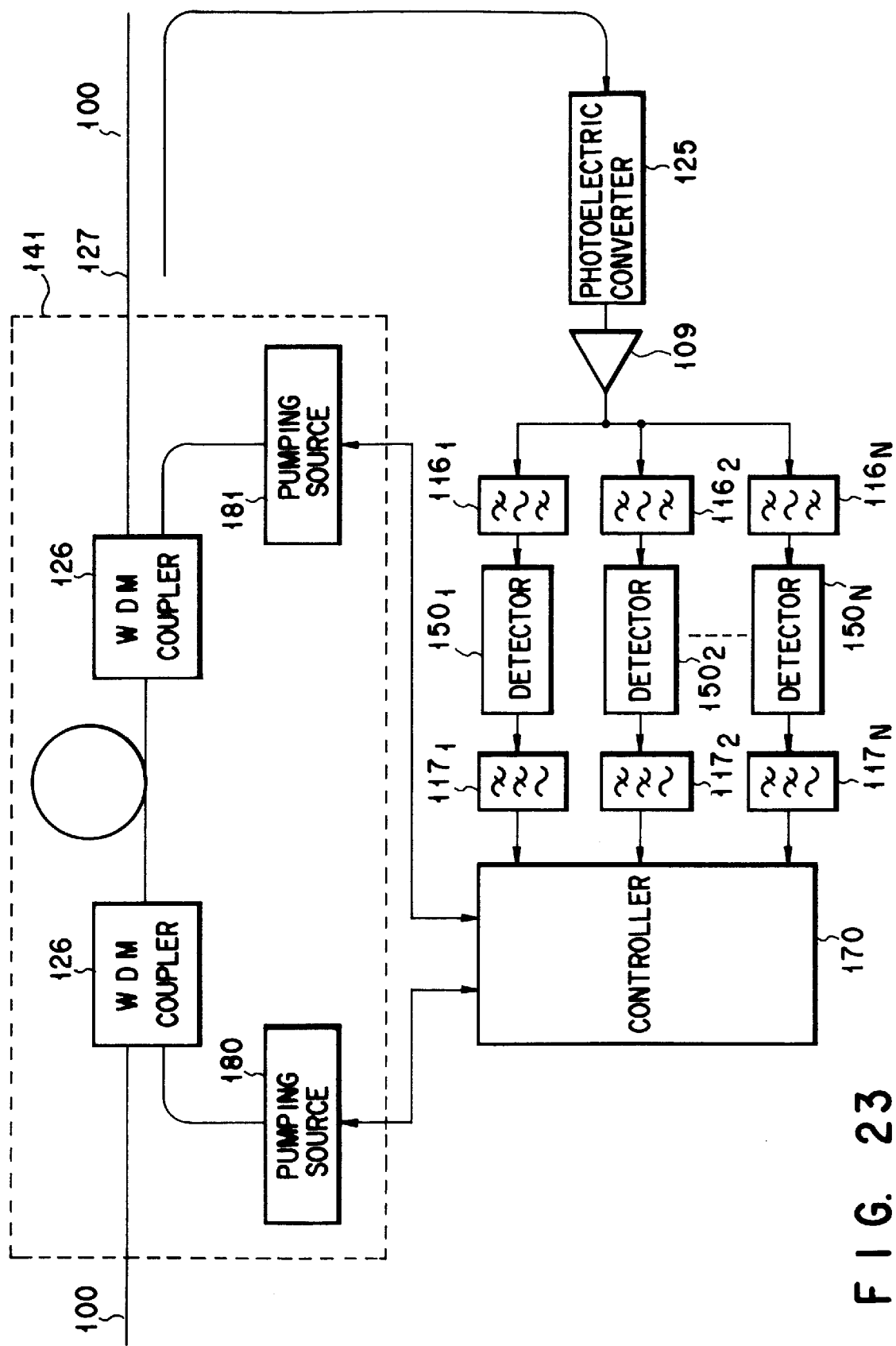
FIG. 23 is a block diagram of the repeater section in a wavelength division multiplexing optical transmission apparatus according to an eighteenth embodiment of the present invention.

FIG. 23 shows the configuration of an optical repeater used with a wavelength division multiplexing optical transmission apparatus according to an eighteenth embodiment of the present invention.

The wavelength division multiplex signal transmitted via an optical fiber 100 from the wavelength division multiplexing optical transmission apparatus explained in the fourteenth, fifteenth, sixteenth, or seventeenth embodiment is amplified by an optical fiber amplifier 141, and is then transmitted via the optical fiber 100. The optical fiber amplifier 141 comprises a WDM coupler 126, an erbium-doped fiber 110, and pumping lasers 180 and 181.

The optical output (wavelength division multiplex optical signal) from the optical fiber amplifier 141 is branched by an optical coupler 127 into two sub-signals; one of them is supplied to a photoelectric converter 125, which converts it into an electric signal. The output of the photoelectric converter 125 is amplified by an amplifier 109, which then demultiplexes it into n sub-signals, which are supplied to band-pass filters $116_1$, $116_2$, ..., $116_N$, respectively. The pass central frequencies of the band-pass filters $116_1$, $116_2$, ..., $116_N$ correspond to the frequencies $f_1$, $f_2$, ... $f_N$ used to stabilize the wavelengths of the semiconductor lasers $111_1$, $111_2$, ..., $111_N$ in the wavelength division multiplexing optical transmission apparatus.

The outputs of the band-pass filters $116_1$, $116_2$, ..., $116_N$ are detected by detectors $150_1$, $150_2$, ..., $150_N$, respectively. A controller 170 controls the gain of the optical fiber amplifier 141 by controlling the output power of the pumping lasers 180 and 181 on the basis of the outputs of the detectors $150_1$, $150_2$, ..., $150_N$.

Figure 24:
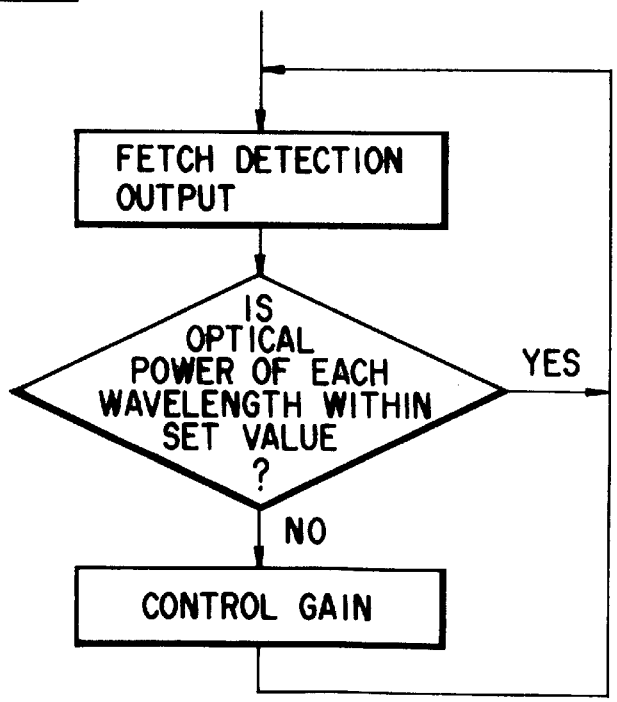
FIG. 24 is a flowchart to help explain gain control in the optical fiber amplifier of the eighteenth embodiment.

Specifically, as shown in the flowchart of FIG. 24, the controller 170 fetches the outputs of the detectors $150_1$, $150_2$, ..., $150_N$ and determines whether or not the output power of each wavelength is within set values. If the output power is not in range of the set values, it controls the gain of the optical fiber amplifier 141.

With the eighteenth embodiment, since the gain of the optical signal of each wavelength can be kept constant, regardless of the number of optical signals multiplexed in the wavelength division multiplex optical signal, the received optical power is always constant in the receiving apparatus, making the receiver performance stable.

As described above, with the present invention, since an abnormal signal is generated when the difference between the wavelength of the semiconductor laser and a wavelength minimizing the loss in the optical wavelength demultiplexer has exceeded an allowable value, the receiver sensitivity can be previously prevented from being deteriorated due to the wavelength fluctuation.

Also, since the abnormality of the wavelength of the transmitter is detected on the side of the transmitter section, the deterioration of the receiver sensibility due to the wavelength fluctuation can be previously prevented.

Also, monitor information is exchanged between the transmitter section and the receiver section when the difference between the wavelength of the transmitter and the wavelength characteristic of the optical wavelength multiplexer/demultiplexer are monitored and the wavelength fluctuation exceeds an allowable value, an abnormal location can be specified.

Also, since the wavelength of the transmitter is controlled so that a S/N ratio at the receiver section is maximum, an optimum condition that the crosstalk between the channels is always suppressed is maintained.

Also, even if the wavelength of the transmitter becomes abnormal during in-service, the service can be continued.

Also, it is possible to provide a wavelength division multiplexing optical apparatus having a wavelength stabilizing mechanism that neither restricts the wavelength capture range to the channel spacing, nor depends on the frequency of the modulation signal used for the semiconductor laser to stabilize the wavelength.

Also, with the present invention, when the wavelengths of more than a specified number of the semiconductor lasers wavelength-controlled have shifted simultaneously toward the long wavelength side or short wavelength side, it is judged that the wavelength characteristic of the optical wavelength multiplexer serving as a wavelength reference has deviated. Then, the alarm is raised or the wavelength characteristic of the optical wavelength multiplexer is controlled to keep the wavelength reference constant, thereby enabling more stable wavelength control.

Additionally, with the present invention, ambient temperature is sensed and the optical wavelength multiplexer is controlled so that the temperature characteristic of the optical wavelength multiplexer may be compensated according to fluctuations in the ambient temperature change.

Still furthermore, an optical repeater of the present invention detects the power of the optical signals multiplexed in the wavelength division multiplex optical signal and on the basis of the detected power, controls the gain of the optical fiber amplifier according to the number of optical signals multiplexed in the wavelength division multiplex optical signal inputted to the amplifier, thereby making the received optical power constant in the receiving apparatus, regardless of the number of optical signals multiplexed, therefore making the receiver performance stable.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A wavelength division multiplexing transmission apparatus comprising:

a demultiplexing section for demultiplexing, for each wavelength, wavelength division multiplex signal transmitted via an optical fiber;

a receiver section for receiving an optical output signal of said demultiplexing section;

a wavelength detecting section for detecting a wavelength difference between a wavelength minimizing the loss in said demultiplexing section and a wavelength of a transmitter on the basis of changes in a received power level of an optical output from said demultiplexing section; and a determining section for determining an abnormality when the wavelength difference detected at said wavelength detecting section has exceeded an allowable value and for informing the abnormality.

2. A wavelength division multiplexing transmission apparatus comprising:

a demultiplexing section for demultiplexing, for each wavelength, a wavelength division multiplex signal transmitted via an optical fiber;

a receiver section for receiving an optical output signal for said demultiplexing section;

a wavelength detecting section for detecting a wavelength difference between a wavelength minimizing the loss in said demultiplexing section and a wavelength of a transmitter; and a determining section for determining an abnormality when the wavelength difference detected at said wavelength detecting section has exceeded an allowable value and for informing the abnormality, and wherein said demultiplexing section includes a control section for controlling a wavelength characteristic of said demultiplexing section, and said wavelength detecting section has a sending section for sending a control signal to said control section and detects the wavelength difference by changing the wavelength characteristic of said demultiplexing section in accordance with the control signal by means of said control section.

3. A wavelength division multiplexing transmission apparatus comprising:

a demultiplexing section for demultiplexing, for each wavelength, a wavelength division multiplex signal transmitted via an optical fiber;

a receiver section for receiving an optical output signal of said demultiplexing section;

a wavelength detecting section for detecting a wavelength difference between a wavelength minimizing the loss in said demultiplexing section and a wavelength of a transmitter; and a determining section for determining an abnormality when the wavelength difference detected at said wavelength detecting section has exceeded an allowable value and for informing the abnormality;

a plurality of semiconductor lasers having different wavelengths; and a laser control section for controlling the operating state of said semiconductor lasers, and wherein said wavelength detecting section has a transmitter section for transmitting a control signal to said laser control section and on the basis of the received signal at said receiver section, detects the wavelength difference based on changes in the operating state of said semiconductor lasers.

4. A wavelength division multiplexing transmission apparatus according to claim 1, further comprising an amplifying section for amplifying a wavelength division multiplex optical signal transmitted via an optical fiber and inputting the amplified wavelength division multiplex optical signal to said demultiplexing section and a gain control section for controlling the gain of said amplifying section on the basis of the optical signal level of the wavelength division multiple optical signal inputted to said demultiplexing section.

5. A wavelength division multiplexing transmission apparatus comprising:

a plurality of semiconductor lasers having different wavelengths;

a first monitoring section for monitoring an operating state of said semiconductor lasers, said operating state including an operating temperature of said plurality of semiconductor lasers;

a wavelength reference unit having reference wavelengths for said semiconductor lasers;

a second monitoring section for monitoring the wavelength differences between each of the wavelengths of said semiconductor lasers and the reference wavelengths of said wavelength reference unit; and a determining section for determining an abnormality on the basis of the monitoring information from said first and second monitoring section, when the wavelength difference monitored at said second monitoring section has exceeded an allowable value, and informing the abnormality.

6. A wavelength division multiplexing transmission apparatus according to claim 5, wherein said wavelength reference unit is an optical wavelength multiplexer.

7. A wavelength division multiplexing transmission apparatus comprising:

a plurality of semiconductor lasers for generating output laser beams having different wavelengths;

a first monitoring section for monitoring an operating state of said semiconductor lasers;

a multiplexing section for multiplexing the output laser beams from said semiconductor lasers to produce a wavelength division multiplex optical signal;

a demultiplexing section for demultiplexing, for each wavelength, the wavelength division multiplex optical signal transmitted via an optical fiber;

a receiver for receiving an optical output signal from said demultiplexing section;

a wavelength detecting section for detecting the difference between a wavelength minimizing the loss in said demultiplexing section and a wavelength of said semiconductor laser based on a signal received by said receiver;

a first decision section for determining an abnormality when said wavelength difference has exceeded an allowable value; and a determining section for determining on the basis of the monitoring information from said first monitoring section and the output signal from said wavelength detecting section whether either the transmitting side or the receiving side is abnormal, when said first decision section has determined an abnormality.

8. A wavelength division multiplexing transmission apparatus according to claim 7, further comprising:

a wavelength reference unit having reference wavelengths for wavelengths of said semiconductor lasers;

a second monitoring section for monitoring the wavelength difference between each of the wavelengths of said semiconductor lasers and the reference wavelength of said wavelength reference unit;

a second decision section for determining an abnormality on the basis of the monitoring information from said first and second monitoring section, when the wavelength difference monitored at said second monitoring section has exceeded an allowable value; and a determining section for determining on the basis of the monitoring information from said first and second monitoring section and the output signal from said wavelength detecting section whether either the transmitting side or the receiving side is abnormal, when said first decision section has determined an abnormality.

9. A wavelength division multiplexing transmission apparatus according to claim 8, wherein said wavelength reference unit is an optical wavelength multiplexer.

10. A wavelength division multiplexing transmission apparatus, according to claim 7, wherein said multiplexing section is an optical wavelength multiplexer and which further includes:

a wavelength detecting section for detecting the wavelengths of said semiconductor lasers from the optical output of said multiplexing section; and a control section for controlling the wavelengths of said semiconductor lasers to a wavelength minimizing the loss in said multiplexing section on the basis of the output of said wavelength detecting section.

11. A wavelength division multiplexing transmission apparatus comprising:

a plurality of semiconductor lasers for generating output laser beams having different wavelengths;

at least one spare semiconductor laser having a different wavelength from those of said semiconductor lasers;

a multiplexing section for multiplexing the output laser beams from said semiconductor lasers to produce a wavelength division multiplex optical signal;

an optical fiber for transmitting the wavelength division multiplex optical signal;

a demultiplexing section for demultiplexing said wavelength division multiplex optical signal for each wavelength;

a wavelength detecting section for detecting a difference between a wavelength minimizing the loss in said demultiplexing section and the wavelengths of said semiconductor lasers;

a decision section for determining an abnormality when said wavelength difference has exceeded an allowable value; and a switching section for switching the data signal to said at least one spare semiconductor laser when said decision section has determined an abnormality.

12. A wavelength division multiplexing transmission apparatus according to claim 2, further comprising an amplifying section for amplifying a wavelength division multiplex optical signal transmitted via an optical fiber and inputting the amplified wavelength division multiplex optical signal to said demultiplexing section, and a gain control section for controlling the gain of said amplifying section on the basis of the optical signal level of the wavelength division multiple optical signal inputted to said demultiplexing section.

13. A wavelength division multiplexing transmission apparatus according to claim 3, further comprising an amplifying section for amplifying a wavelength division multiplex optical signal transmitted via an optical fiber and inputting the amplified wavelength division multiplex optical signal to said demultiplexing section, and a gain control section for controlling the gain of said amplifying section on the basis of the optical signal level of the wavelength division multiple optical signal inputted to said demultiplexing section.

* * * * *